United States Patent
Kertai et al.

(10) Patent No.: US 12,414,491 B2
(45) Date of Patent: Sep. 16, 2025

(54) MULTI-VEHICLE COORDINATION SYSTEMS AND METHODS FOR AGRICULTURAL FIELD OPERATIONS

(71) Applicant: Raven Industries, Inc., Sioux Falls, SD (US)

(72) Inventors: Dean Russell Kertai, Regina (CA); Joshua James Dalbert Friedrick, Yorkton (CA); Caleb Vaughn Friedrick, Regina (CA); Thomas Dean Chadwick, Regina (CA); Thomas Antony, Ames, IA (US); Andrew David Stelter, Sioux Falls, SD (US); Jared Ernest Kocer, Sioux Falls, SD (US)

(73) Assignee: Raven Industries, inc., Sioux Falls, SD (US)

( * ) Notice: Subject to any disclaimer, the term of this patent is extended or adjusted under 35 U.S.C. 154(b) by 254 days.

(21) Appl. No.: 17/930,866

(22) Filed: Sep. 9, 2022

(65) Prior Publication Data
US 2023/0081037 A1      Mar. 16, 2023

Related U.S. Application Data

(60) Provisional application No. 63/242,953, filed on Sep. 10, 2021.

(51) Int. Cl.
   *A01B 69/04*    (2006.01)
   *G05D 1/00*     (2024.01)
(52) U.S. Cl.
   CPC ......... *A01B 69/008* (2013.01); *G05D 1/0219* (2013.01); *G05D 1/0291* (2013.01)
(58) Field of Classification Search
   CPC .. A01B 69/008; G05D 1/0219; G05D 1/0291; G05D 1/0027; G05D 1/0044
   See application file for complete search history.

(56) References Cited

U.S. PATENT DOCUMENTS

| 6,205,381 B1 * | 3/2001 | Motz ................... A01B 69/008 701/25 |
| 10,394,238 B2 | 8/2019 | Foster et al. |

(Continued)

FOREIGN PATENT DOCUMENTS

| FR | 3095572 | 11/2020 |
| WO | 2020206945 | 10/2020 |
| WO | 2023039190 | 3/2023 |

OTHER PUBLICATIONS

"International Application Serial No. PCT US2022 043106, International Preliminary Report on Patentability mailed Oct. 20, 2023", 10 pgs.

(Continued)

*Primary Examiner* — Aniss Chad
*Assistant Examiner* — Nikki Marie M Molina
(74) *Attorney, Agent, or Firm* — Schwegman Lundberg & Woessner, P.A.

(57) ABSTRACT

Control systems and methods for coordinating multiple agricultural machines for operation on an agricultural field are provided. Each machine may receive field data for an agricultural field that optionally includes a plurality of pre-defined swaths. Each machine may receive state data from other machine(s). The state data for the other machine(s) may include a next swath and a current swath. Each machine may, after an indication of a start of its current swath, determine a next swath based on open swaths and the state data for the other machine(s). A next swath may also be determined using vehicle kinematic data, and conflicts between machines may be resolved.

38 Claims, 24 Drawing Sheets

(56) References Cited

U.S. PATENT DOCUMENTS

2018/0359905 A1* 12/2018 Foster ................. A01B 69/008
2018/0364739 A1* 12/2018 Foster ................. G05D 1/0268
2020/0089242 A1* 3/2020 Kowalchuk .......... G05D 1/0297

OTHER PUBLICATIONS

"International Application Serial No. PCT US2022 043106, International Search Report mailed Nov. 28, 2022", 5 pgs.
"International Application Serial No. PCT US2022 043106, Written Opinion mailed Nov. 28, 2022", 7 pgs.
"Australian Application Serial No. 2022341294, First Examination Report mailed Oct. 28, 2024", 3 pgs.
"Australian Application Serial No. 2022341294, Response filed Feb. 10, 2025 to First Examination Report mailed Oct. 28, 2024", 75 pgs.
"European Application Serial No. 22793257.1, Communication Pursuant to Article 94(3) EPC mailed Jan. 3, 2025", 4 pgs.
"Canadian Application Serial No. 3,230,621, Examiners Rule 86(2) Report mailed Mar. 6, 2025", 6 pgs.
"Australian Application Serial No. 2022341294, Subsequent Examination Report mailed Mar. 5, 2025", 4 pgs.
"European Application Serial No. 22793257.1, Response filed May 2, 2025 to Communication Pursuant to Article 94(3) EPC mailed Jan. 3, 2025", 16 pgs.
"Canadian Application Serial No. 3,230,621, Response filed Jun. 11, 2025 to Office Action mailed Mar. 6, 2025", W English Claims, 42 pgs.

* cited by examiner

500 →

| Multi Machine Task Planner | | |
|---|---|---|
| Presets | Select a Preset ⌄ | — 510 |
| Task Name | Multi Machine Task 29/06/21, 0 | — 515 |
| Selected Vehicles | ☐ OMNiPOWER-1 | |
| | Select Vehicles | — 520 |
| AB Direction | − 0.0 deg + | — 525 |
| AB Distance | − 30.0 ft + | — 530 |
| Field Headlands | − 3 + | — 535 |
| | Cancel    Send | |

Multi Machine Task Planner

☐ OMNiPOWER-2

[Select Vehicles]

| AB Direction | − 0.0 deg + |
| --- | --- |
| AB Distance | − 30.0 ft + |
| Field Headlands | − 0 + |
| Obstacle Headlands | − 3 + — 540 |
| Headland Order | First ∨ — 545 |
| Headland Direction | Automatic ∨ — 550 |

[Cancel] [Send]

Multi Machine Task Planner

| Field Headlands | − 0 + |
| Obstacle Headlands | − 3 + |
| Headland Order | First ⌄ |
| Headland Direction | Automatic ⌄ |
| Field Safety Buffer | − 300.0 ft + | ~560
| Large Obstacle Safety Buffer | − 3.3 ft + | ~565
| Small Obstacle Safety Buffer | − 3.3 ft + | ~570

Cancel  Send

FIG. 5C

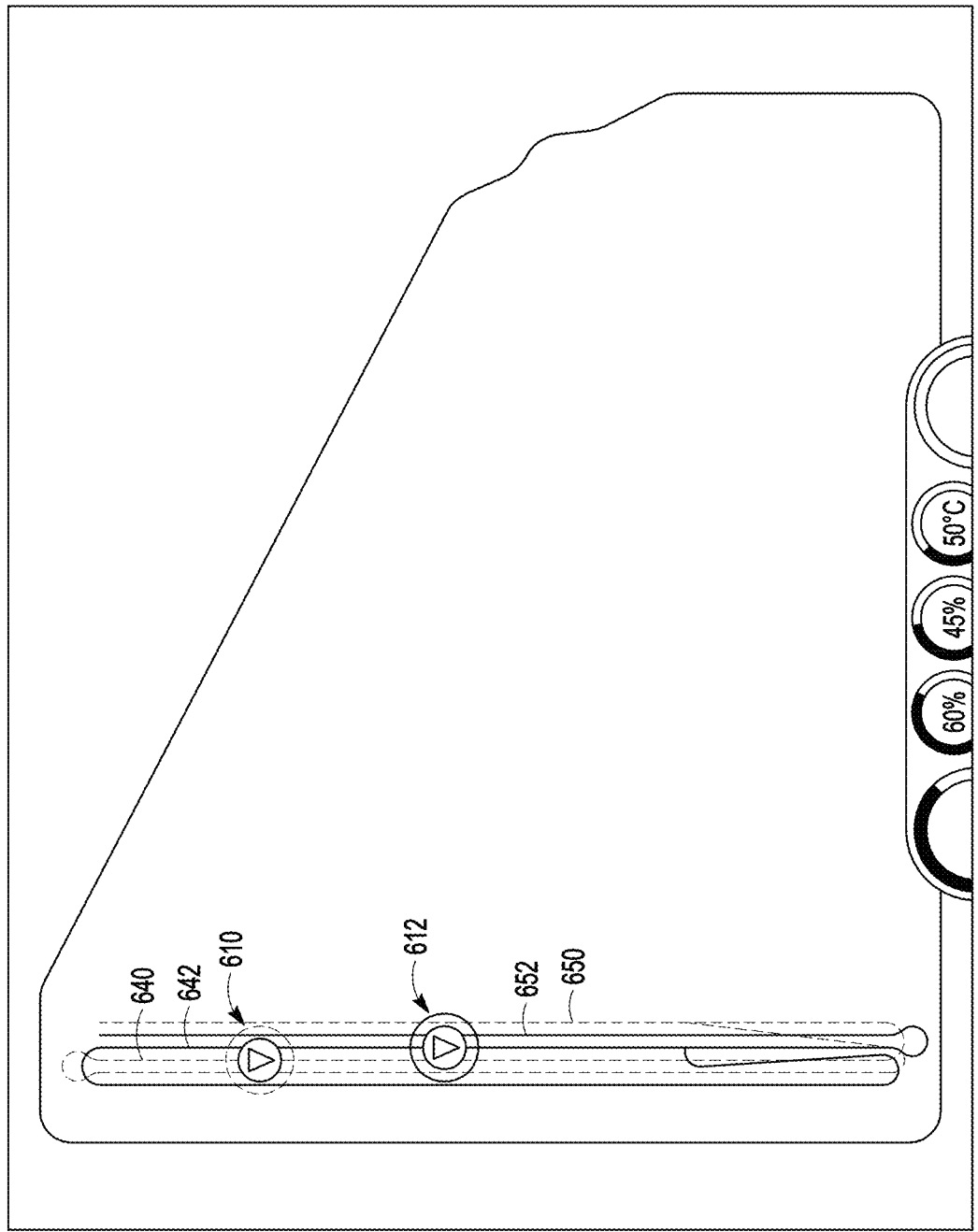

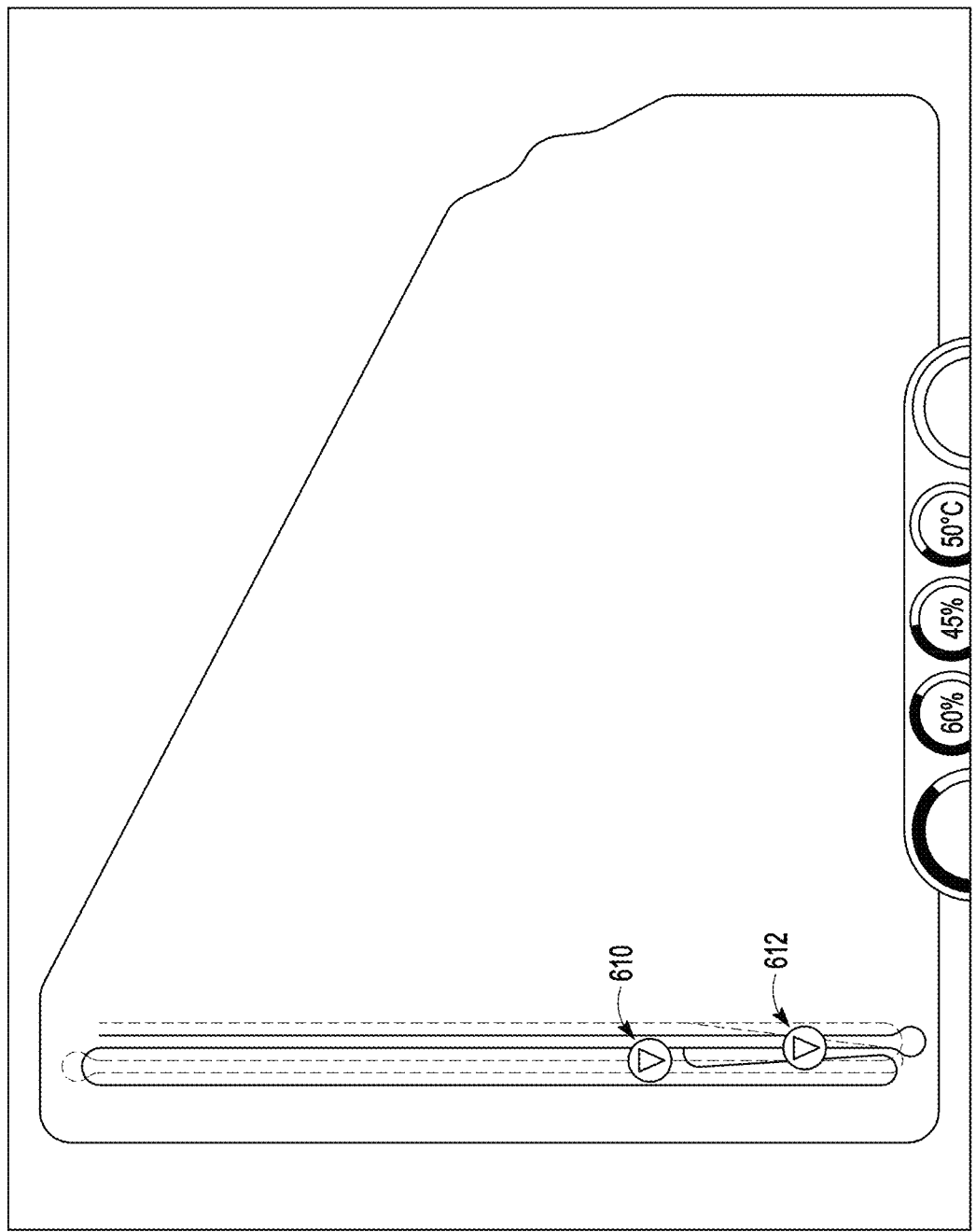

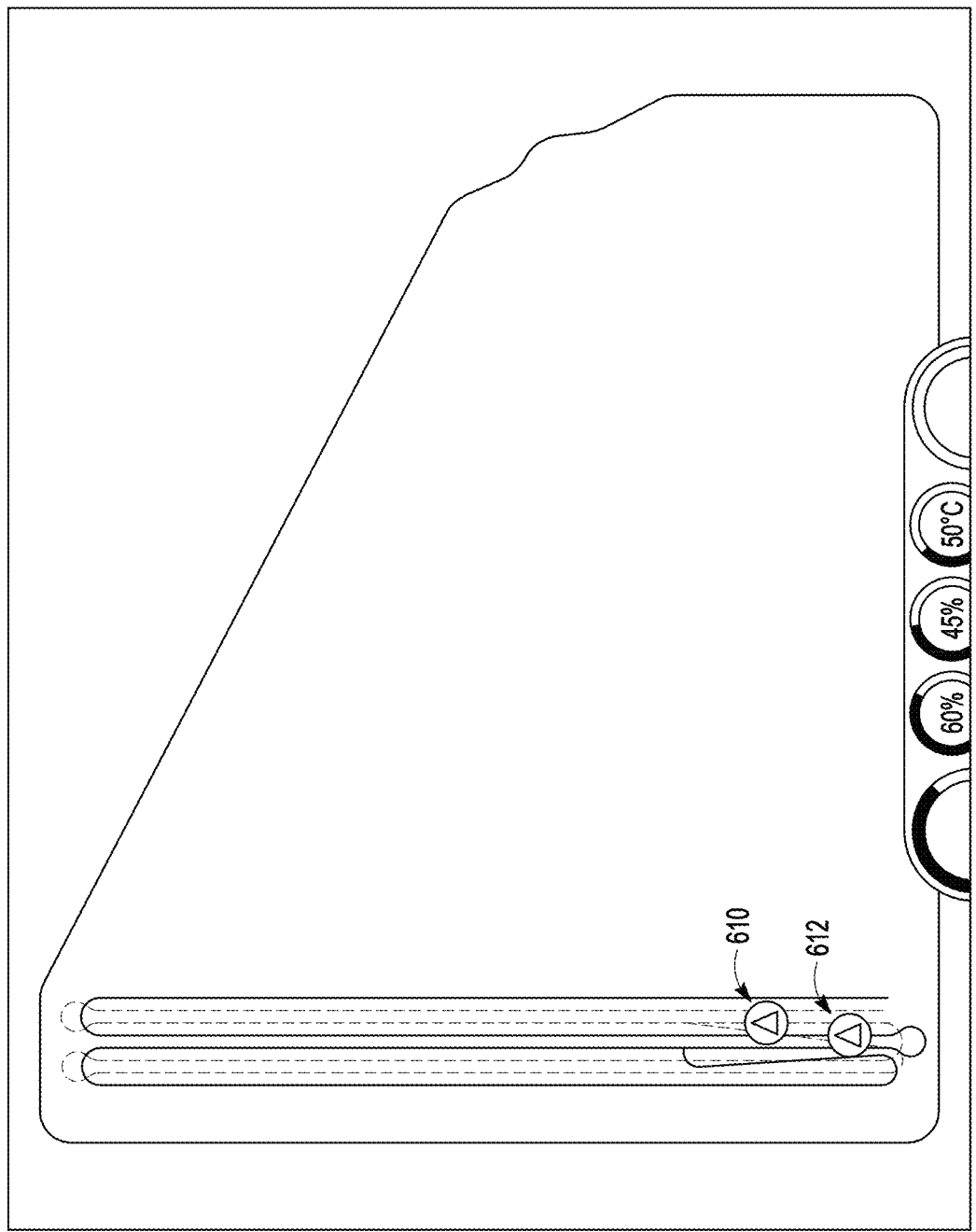

MULTI-VEHICLE COORDINATION SYSTEMS AND METHODS FOR AGRICULTURAL FIELD OPERATIONS

CLAIM OF PRIORITY AND INCORPORATION BY REFERENCE

The present application claims the benefit under 35 U.S.C. § 119(e) of U.S. Provisional Patent Application 63/242,953, filed Sep. 10, 2021, which is hereby incorporated by reference herein in its entirety.

TECHNICAL FIELD

Embodiments pertain to coordinating agricultural vehicles performing an operation. Some embodiments more specifically relate to coordinating multiple autonomous agricultural vehicles.

BACKGROUND

Modern agricultural operations generally include the use of agricultural machines (e.g., tractors, harvesters, sprayers, seeders, tillers, combines, etc.) to process fields, for instance by planting, harvesting, or generally tending to crops. In some situations, two or more agricultural machines (also referred to as vehicles) are operated together to execute a field processing task, such as harvesting a crop, transporting a crop or cutting and baling plants.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 5A-C illustrate example user interfaces for setting up a coordinated ag vehicle task, according to some examples of the present disclosure.

FIGS. 6A-F illustrate one example of a coordinated ag vehicle task, according to some examples of the present disclosure.

SUMMARY

The inventors have recognized that effectively coordinating multiple agricultural machines in performing a field operation (which may include one or more different suboperations) can increase the efficiency of farming by, for example, reducing cost, reducing downtime, and/or increasing yield. They have also recognized that using multiple smaller (e.g., 30-foot width) machines in place of a larger (e.g., 60-foot width) machine can provide significant benefits. Use of more, smaller machines can increase capacity, reduce soil compaction, and reduce downtime. It is easier to pull a smaller machine offline (e.g., to refill the machine or service the machine) while continuing to operate the other machines in the field. For example, if using three smaller machines to handle a field operation instead of a single larger machine, a smaller machine can be taken offline and only a third of the capacity is lost. With the larger machine, if it is taken offline, all capacity would be lost. The inventors have further recognized a challenge with pre-planned routes for vehicles in the field. If a machine goes offline, the pre-planned path for the offline machine may be left undone until the machine is back online or until a user creates a new route plan.

The present disclosure provides technology (e.g., systems and methods) that facilitate the coordination of multiple agricultural machines in a field. The present technology may, as an example, receive field data (e.g., a pre-defined coverage plan having a plurality of swaths to complete) and dynamically determine a next swath for each machine in the field on a real-time basis (e.g., determine a next swath for a machine while operating on a current swath). The present disclosure provides technology for dynamically determining a travel path for a machine from a current swath to the next swath. The present disclosure further provides technology for determining a potential collision between a machine and another machine in field and avoiding the potential collision by, e.g., adjusting the speed and/or travel path of one or both machines. The present disclosure also provides technology for addressing conflicts which may occur when more than one machine in a field requests the same next swath. The present disclosure may be used on smaller, self-propelled autonomous power platforms that easily interchange farm implements like a sprayer or spreader. These self-propelled power platforms, such as an OMNiPOWER™ platform, may work together on an operation and may also work in a coordinated manner with larger machines and human-driven machines.

DETAILED DESCRIPTION

Figure 1:
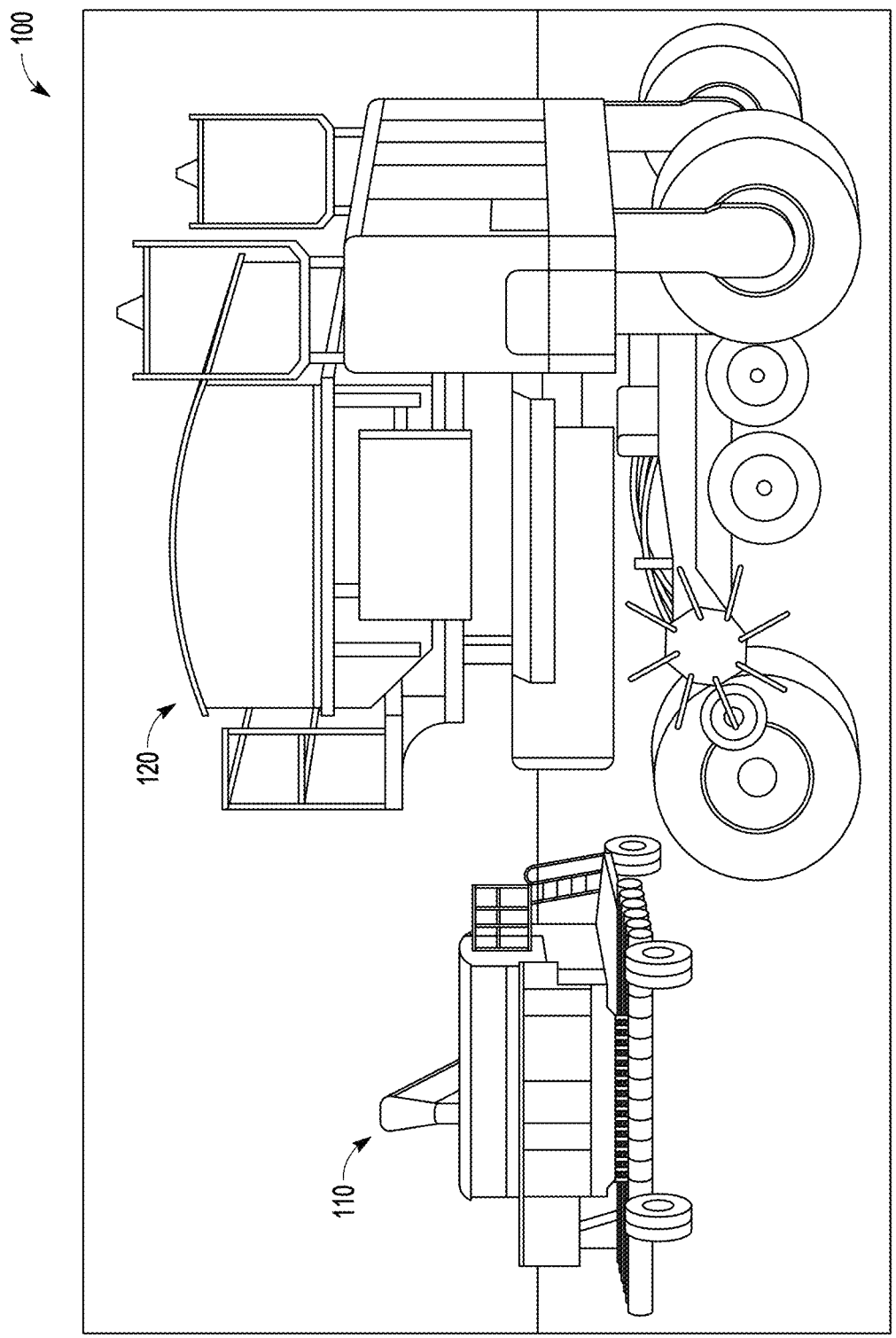
FIG. 1 illustrates an environment with multiple, coordinated ag vehicles, according to some examples of the present disclosure.

FIG. 1 illustrates an agricultural (ag) environment 100 for field operation. The environment 100 includes two ag machines 110, 120 working in coordination on an ag operation. An agricultural (ag) machine or vehicle may be any powered vehicle for performing an agricultural operation, including tractors, harvesters, sprayers, seeders, tillers, combines, grain carts, self-powered platforms, implements, towed implements, etc. An agricultural operation can include a single operation (e.g., spraying) or multiple sub-operations (e.g., rolling and seeding, harvesting and hauling, etc.). While two machines 110, 120 are illustrated, the present disclosure may work in environments with an unlimited number of machines (e.g., plural machines are shown in FIGS. 7A-9). The environment 100 may also include different types of vehicles such as self-powered platforms (e.g., machines 110, 120) and larger machines such as sprayers, harvesters, etc. The environment may also include human-driven machines that coordinate with autonomous machines.

Figure 2:
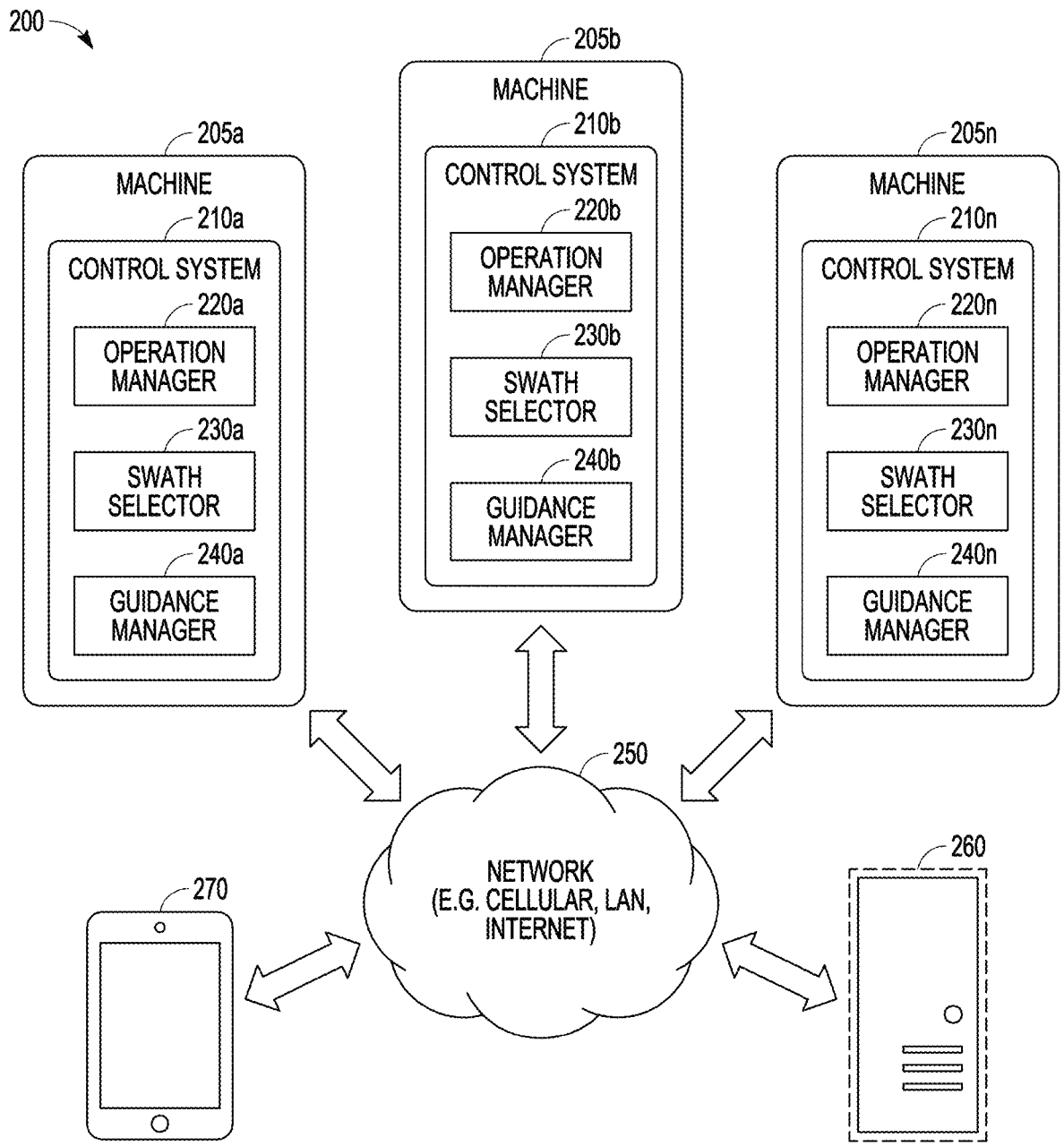
FIG. 2 illustrates a system for coordinated ag vehicle control, according to some examples of the present disclosure.

FIG. 2 illustrates a system 200 for coordinated ag vehicle control, according to examples of the present disclosure. The system 200 includes multiple ag machines 205a-n each having a control system 210a-n that includes an operational manager 220a-n, a swath selector 230a-n, and a guidance manager 240a-n. The control systems 210a-n may communicate with one another over a network 250. The network 250 may, for example, include a cellular network. In other examples, the network may include a wide area network, a local area network, and/or direct, line of sight vehicle to vehicle communication (e.g., a short range, peer-to-peer network) and relaying. The example system 200 further includes a relay server 260 and a remote user control 270. The control systems 210a-n may communicate data with one another through the relay server 260 using the network 250. The user control 270 may be used by a user to provide field data for the field (e.g., a field boundary, headlands, and/or a pre-defined set of swaths for a field) and configure a task (e.g., type of task, vehicle selection, etc.) for the multiple ag machines 205a-n. Each of the machines 205a-n may further include a field computer and steering controller (not shown) as part of and/or in communication with a control system 210a-n of a machine 205a-n. The machines 205a-n may be autonomous vehicles and may optionally include human-driven machines as well. A swath may be any route, path, contour or line over which a vehicle is to travel for a field operation. A swath may, for example, include indexed AB lines, a contour, a headland swath, an obstacle swath, and the like.

The field data may include a pre-defined coverage plan (e.g., pre-defined headland swaths, pre-defined obstacle swaths, and pre-defined interior swaths such as AB lines) which covers the entire field. In other examples, the field data may include field boundaries (and optionally headland swaths) with the machines determining their swaths (e.g., AB lines or contours) dynamically during operation, rather than by selecting from pre-defined swaths. In this latter example, the machines may dynamically determine a coverage plan for the field during operation (e.g., based on implement width, application width, desired swath spacing and/or machine availability). In another example, field data may include data from previous operations on the field, and the control system 210a-n may dynamically determine swaths and/or paths between swaths based on the prior operations data. The prior operations data may include one or more of previous guidance (e.g., last-pass lines, swaths, paths, etc.) or previous as-applied data (e.g., data regarding a prior application of agricultural product) for a prior operation (e.g., a prior year). In other examples, a coverage plan may include pre-defined swaths that are adjusted during operation based on the travel path of the machine completing a swath (e.g., if a machine moves off a pre-defined swath, an adjacent swath may be adjusted).

Each operational manager 220a-n may maintain state data for its respective machine 205a-n and state data for the other machines 205a-n. State data for a machine 205a-n may include vehicle kinematic data including one or more of location, heading, acceleration, yaw, and speed data and dimensional profile data for a machine. Dimensional profile data may include or be a function of a width of a machine, for example. State data for a machine 205a-n may also include a current swath on which the machine 205a-n is operating, a next swath for the machine 205a-n, and a path between the current swath and next swath for the machine 205a-n. As will be discussed below, state data may be used to dynamically determine swaths and paths for the machines 205a-n as they complete a task. Each operational manager 220a-n may determine future vehicle locations (e.g., based on swaths, paths, speed, and/or heading, etc.) and adjust a vehicle property (e.g., swath, travel path, and/or speed, etc.) to minimize impact to operations. For example, each operational manager 220a-n may manage collision avoidance by, e.g., identifying potential collisions and sending a command to adjust a speed and/or travel path of its respective machine 205a-n to avoid the potential collision. The operational managers 220a-n may coordinate with one another to negotiate vehicle future locations to minimize impact to operations. For example, if three machines were on paths to collide, their operational managers may determine different options for avoiding any collision (e.g., option 1 to slow machine 1 down; option 2 to slow down machines 2 and 3) and may select the option that results in the most desirable future state for the three machines. Each operational manager 220a-n may for example communicate with a machine's field computer to control speed.

Each of the swath selectors 230a-n may dynamically determine swaths for its respective machine 205a-n and dynamically determine travel paths between the swaths. Each swath selector 230a-n may communicate with its respective operational manager 220a-n and guidance manager 240a-n. Each swath selector 230a-n may generally determine a next swath for its respective machine 205a-n based on one or more of the field data, its current swath, the current and next swaths for other machines 205a-n in its task group, the type of task (e.g., coordinated or disperse), behavior optimization factors, location, heading, and speed and dimensional profile data for its machine 205a-n and the other machines 205a-n. Where the field data includes a pre-defined coverage plan with pre-defined swaths, a swath selector may dynamically determine a next swath by selecting a remaining open swath in the coverage plan based on one or more of the above factors. Where the field data includes areas of a field (or an entire field) without pre-defined swaths, a swath selector (or operational manager) may determine a next swath dynamically, for example, by generating a next swath based on one or more of an application width, implement width, desired swath spacing, etc. Where the field data includes prior operations data, a swath selector may determine a swath and/or path between swaths using the prior operations data and optionally the type of operation being performed. For example, based on the type of operation, a swath selector may prioritize the generation or selection of swaths and/or paths to avoid or minimize overlap with prior swaths or paths identified in the prior operations data.

Each swath selector 230a-n may further determine a travel path between a current swath of its machine 205a-n and the determined next swath. The swath selectors 230a-n may further resolve conflicts when the swath selector 230a-n of one of the machines 205a-n requests the same next path as the next path determined by the swath selector 230a-n of one or more of the other machines 205a-n. Each swath selector 230a-n sends its respective guidance manager 240a-n swath and path data so that the guidance manager may determine guidance data (e.g., an AB line, a vector, a row or row offset, etc.) and provide the guidance data to one or more vehicle controllers such as a steering controller (not shown) for the machine. With a human-driven machine, the swath selector 230a-n or guidance manager 240a-n may issue a command to display the next swath and travel path to the swath for the driver.

Each of the operational managers 220a-n, swath selectors 230a-n and guidance managers 240a-n may operate on one or more processors on its respective machine 205a-n and while illustrated as separate modules, they may be part of a single software module. In other examples, the functions performed by each of the operational managers 220a-n, swath selectors 230a-n and guidance managers 240a-n may be performed on a computer system remote from a respective machine and may operate in a distributed manner across multiple computing systems.

Figure 3:
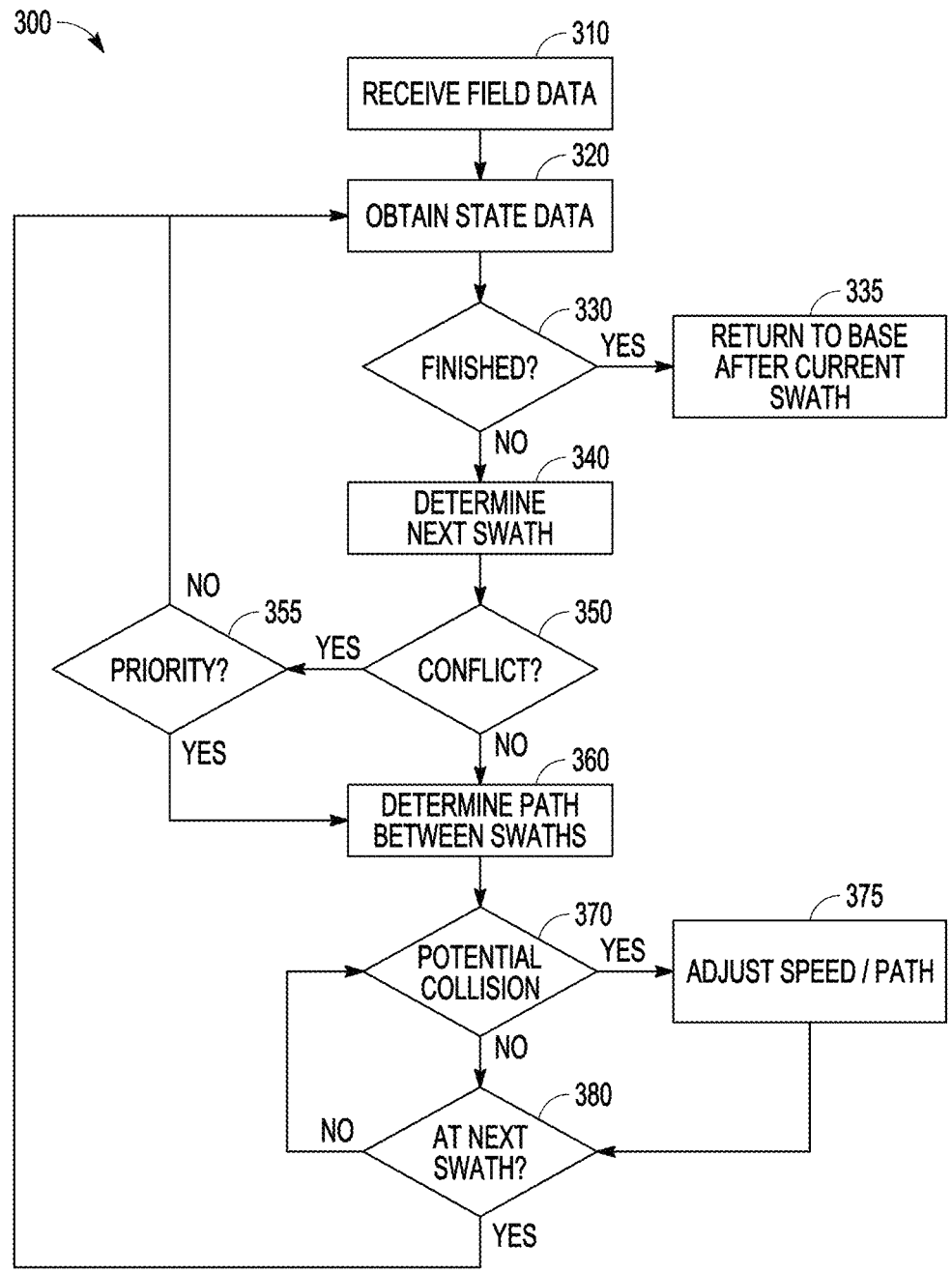
FIG. 3 illustrates a flowchart of a method of coordinating multiple ag machines, according to some examples of the present disclosure.
Figure 4:
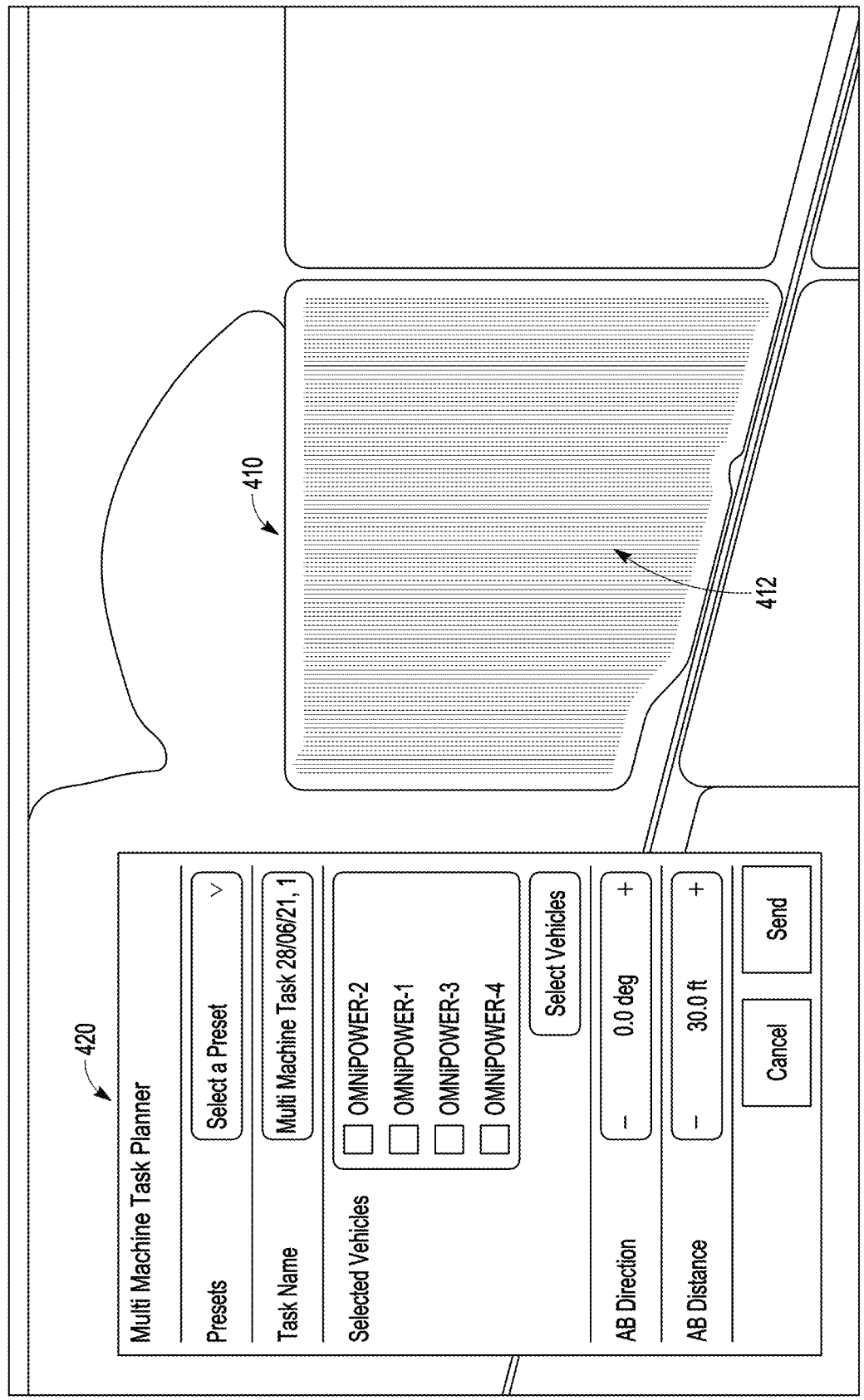
FIG. 4 illustrates one example of a coverage plan, according to some examples of the present disclosure.

FIG. 3 illustrates a flowchart of a method of coordinating multiple machines, according to some examples of the present disclosure. Method 300 may be performed by a computing system. Method 300 may be performed by the guidance manager, swath selector, and operation controller of each machine of multiple machines in a multi-machine task for a coverage plan, as discussed above for example. At operation 310 the method includes receiving, by a respective machine of multiple machines, field data for an agricultural field. The field data may include a coverage plan with a plurality of pre-defined swaths for the field. The coverage plan may further include headlands, boundary areas, etc. The coverage plan may be provided by a user from a remote location (e.g., a remote ground station) via a relay server, for example. In other examples, a coverage plan may in full or in part be determined dynamically by the machines. For example, the field data may include a field boundary (and optionally headland and obstacle swaths) but not pre-defined swaths for the entire field (e.g., there may be some or no pre-defined interior swaths). The field data may further include prior operations data, as discussed above. The method may further include receiving a type of task to be performed such as a dispersed task where machines move in different directions or to different locations or a coordinated task where two or more of the machines operate together (e.g., adjacent one another, side-by-side, in a leader-follower arrangement, etc.). While the method may be illustrated by discussing a respective machine, it should be understood that each of the machines involved in a task may perform the methods described herein. FIG. 4 by way of example illustrates a coverage plan 410 for a set of ag machines 420. The coverage plan 410 includes a plurality of swaths 412 on which an operation is to be performed.

At block 320, the method includes receiving, by the respective machine, state data from the other machine(s) performing the task. The state data for each of the one or more other machines may include a next swath and a current swath. The state data may also include other data about the machines in the task, the environment, and the operations. This may include machine position, speed, heading, travel paths, swaths, weather and other environmental data, coverage plan completion data, behavioral optimization factors, etc. Each machine in the task may generally maintain its own state data and communicate its state data to the other machines using a network. At block 330, the method includes the respective machine determining whether the field operation is finished. This may include an operational manager checking for remaining open swaths in a coverage plan, or where a coverage plan is dynamically determined, determining whether the completed swaths cover the field boundaries. This dynamic coverage plan generation may include determining whether an open area of the field remains of sufficient width for a swath, for example, based on an implement width, application width and/or desired spacing of swaths. At block 335, if no open swaths (e.g., open pre-defined swaths or open field areas) remain, the method may continue with the machine determining a path to return to a home base after finishing its current swath. Note while the method 300 illustrates obtaining state data at block 320, it should be appreciated that the state data for each machine may be maintained (received, stored, updated, communicated, etc.) while other blocks of the method 300 are being performed.

At block 340, if the field remains open (e.g., pre-defined swaths of a coverage plan remain open or areas of the field remain open for another swath), the respective machine may determine its next swath after starting its current swath. For example, a swath selector or operational manager may determine an indication of a start of a current swath using the location of the machine and the positional data of the swath. Dynamically determining a next swath for a machine only after starting its current swath provides flexibility advantages, allowing machines to go offline and other machines to pick up additional open swaths. A machine may determine its next swath based on open swaths of the coverage plan and the state data for each of the one or more other machines. Additional techniques for determining a next swath for a machine are discussed below.

At block 350, the method includes determining if there is a conflict between a next swath of the respective machine and one or more other machines. For example, the swath selector may compare the next swath for its machine against the next swaths of the other machines (based on the state data received from the other machines) to determine if there is a conflict (e.g., two or more machines requesting the same next swath). If there is a conflict, flow may move to block 355 where a respective machine determines if it has priority over the other machine(s) with the same next swath. The conflict may be resolved based on a pre-determined priority between the respective machine and the other machine(s). For example, the machines may be provided with serial numbers and the higher serial number may have priority. In other examples, priority may be determined based on characteristics of the machines (e.g., location of the machine, location relative to the requested next swath, fuel level, product level, etc.). If there is a conflict and the respective machine does not have priority, flow may move to block 320 and the method may continue until a next swath without a conflict is determined (or the coverage plan/field is finished). For example, a respective machine may determine a next swath (e.g., an initial next swath) for itself is the same as the next swath of another, second machine and may determine an updated next swath for itself after determining the second machine has swath priority.

A machine may determine a next swath (block 340) in various ways. For example, a next swath for a respective machine may be determined based on a distance to a next swath. For example, an available swath that is closest to the location of the machine or the current swath of the machine may be selected as the next swath. In another example, an available swath that is closest subject to certain conditions may be selected. The conditions may include, but are not limited to, a path to the next swath having turns that may be completed without encountering boundaries. A next swath may also be determined based on a dimension profile of the respective machine. For example, a coverage plan may define a swath as having a desired width and only machines with the desired width may select the swath. A next swath may be determined based on a heading of the respective machine and a heading of a second machine. For example, a next swath may be selected only if machines on adjacent swath(s) are heading in the same direction (e.g., to avoid a collision). In another example, a next swath may be determined based on the current swath and heading of the respective machine, the heading for each of the one or more other machines, the current swath of each of the one or more other machines, and the next swath for each of the one or more other machines. In some examples, determining the next swath for a respective machine may further be based on a type of task being performed (e.g., a dispersed task or a coordinated task) or one or more behavioral optimization factors (e.g., one or more factors to optimize path lengths to save on fuel, minimize path overlaps to reduce soil compaction, optimize coverage of an agricultural product being dispensed). In a coordinated task, for example, one machine may select a swath that is adjacent and/or parallel with a swath of a second machine. In a dispersed task, the machines may select swaths in different locations or in different directions than other machines. A swath selector may determine a next swath taking into account weather conditions. For example, with adverse weather, the swath selector may subdivide a coverage plan into swath regions and determine a next swath only in a particular region before allowing a swath in another region to be selected. By limiting the selection of a next swath for each of the agricultural machines to a particular region until the region is finished, a farm operator is better able to manage the farm operation. It is, for example, easier to restart operations after weather has passed. Adverse weather may be determined based on weather data or notifications received by the operational manager. The size (e.g., width of the ag machines may be used to determine a next swath. For example, certain swaths or swath regions may be defined as allowing only machines of a certain width to be used. In other examples, the swath selector may determine swaths for smaller machines to start on one side of a coverage plan and may determine swaths for larger machines to start on the other side of the coverage plan. Combinations of any one or more of these techniques for determining a next swath may be used. With a dynamic coverage plan (as opposed to a coverage plan with all pre-defined interior swaths), an open swath may be dynamically populated (e.g., based on desired swath spacing). For example, when a machine determines a next swath or begins operation on a current swath, an open swath may be generated for an adjacent area of the field that is offset by the next swath/current swath by the width of an available machine/implement or a width of a product application by an available machine.

The method moves to block 360 where a travel path between the current swath and the determined next swath for a machine is determined. A travel path for a machine may be determined dynamically, by each respective machine. For example, a travel path between the current swath of a respective machine and the next swath of the respective machine may be determined while the respective machine is operating on its current swath. The path may be determined using various techniques. For example, the path may be determined based on one or more of headland data and boundary data for the field, turn radius of the machine, the paths and/or swaths of the machine or other machines, previous operations of the machine or other machines (including portions of the field that are open after harvesting) or the like.

At block 370, the method may include determining if there may be a potential collision between a respective machine and one or more other machines and, if so, adjusting a speed and/or travel path (block 375) of the machine (and/or one or more other machines) to minimize the likelihood of collision. This may be performed while the machine operates on its current swath and/or its travel path between swaths. For example, an operational manager for a machine may determine a potential collision between the respective machine and a second machine based on i) a speed and a future path of the respective machine and ii) a speed and a future path of a second machine, and adjust the speed and/or travel path (e.g., update the determined travel path) of the respective machine to avoid the potential collision. A future path may be determined based on a machine's planned future travel over its current swath, its next swath and its determined travel path between its current and next swaths. Speed may be adjusted by sending a command to a field computer for the machine. A potential collision may further be determined based on a dimension profile of the respective machine and a dimension profile of the second machine. For example, operational managers may store profile data such as a machine width or dimensions, or a hazard zone (e.g., a masked area around a machine including any implement connected thereto), and use this profile data to determine if the machines will overlap while traveling at current speed on its future path (and if so, one or more of the controllers may adjust the speed or travel path of its respective machine). The method may include determining different options for adjusting speed and/or paths of one or multiple machines to avoid a collision and may select the option that results in the machine(s) having the most desirable vehicle futures. When it is determined that the machine has reached the next swath (block 380), the process may repeat to obtain a next swath for the machine until the coverage plan is finished.

FIGS. 5A-5C illustrate a user interface 500 according to some examples of the present disclosure. The user interface (UI) 500 may be implemented on a remote user device in communication with one or more agricultural machines over a network. The UI 500 may be implemented using one or more display screens. The UI 500 may receive user input setting up one or more tasks and operations for a set of agricultural machines. The user input may be received through various UI elements including dropdown lists, buttons, toggles, alphanumeric fields, date fields, sliders, icons, and the like.

With reference to FIG. 5A, the illustrated UI includes a field 510 for selecting a preset implement, if available. Input field 515 allows a user to define a task name. The UI receives a user selection of vehicles for the task through field 520. The selected vehicles may vary and may be of the same or different types. Through input fields 525 and 530, the UI may receive an AB direction and AB distance. AB direction is the direction of the AB lines (e.g., zero degrees may be north, 90 degrees east, etc.) AB distance is the perpendicular distance between AB lines (this may, for example, be a function of implement width). The number of field headlands may be received through input field 535. The number of field headlands may, for example, represent the number of perimeter swaths in the coverage plan. With reference to FIG. 5B, the UI 500 may receive a number of obstacle headlands through field 540. This may, for example, represent swaths around obstacles in the field. A headland order and headland direction may be received through input fields 545 and 550. This, for example, allows a user to specify whether the ag machines operate on the headlands first or last (e.g., after operating on AB line swaths) and allows a user to specify a travel direction on the headlands (e.g., clockwise or counterclockwise) if desired. With reference to FIG. 5C, a field safety buffer may be received from a user through field 560. Large and small obstacle safety buffers may be received through input fields 565 and 570. The safety buffers may be added to a machine profile (e.g., a dimension, width, hazard zone of a machine in the task) to provide extra tolerance for the machines (e.g., a machine implement edge) when operating near a physical boundary such as an obstacle or field boundary (e.g., on the outermost field headland or innermost obstacle headland).

Figure 6A:
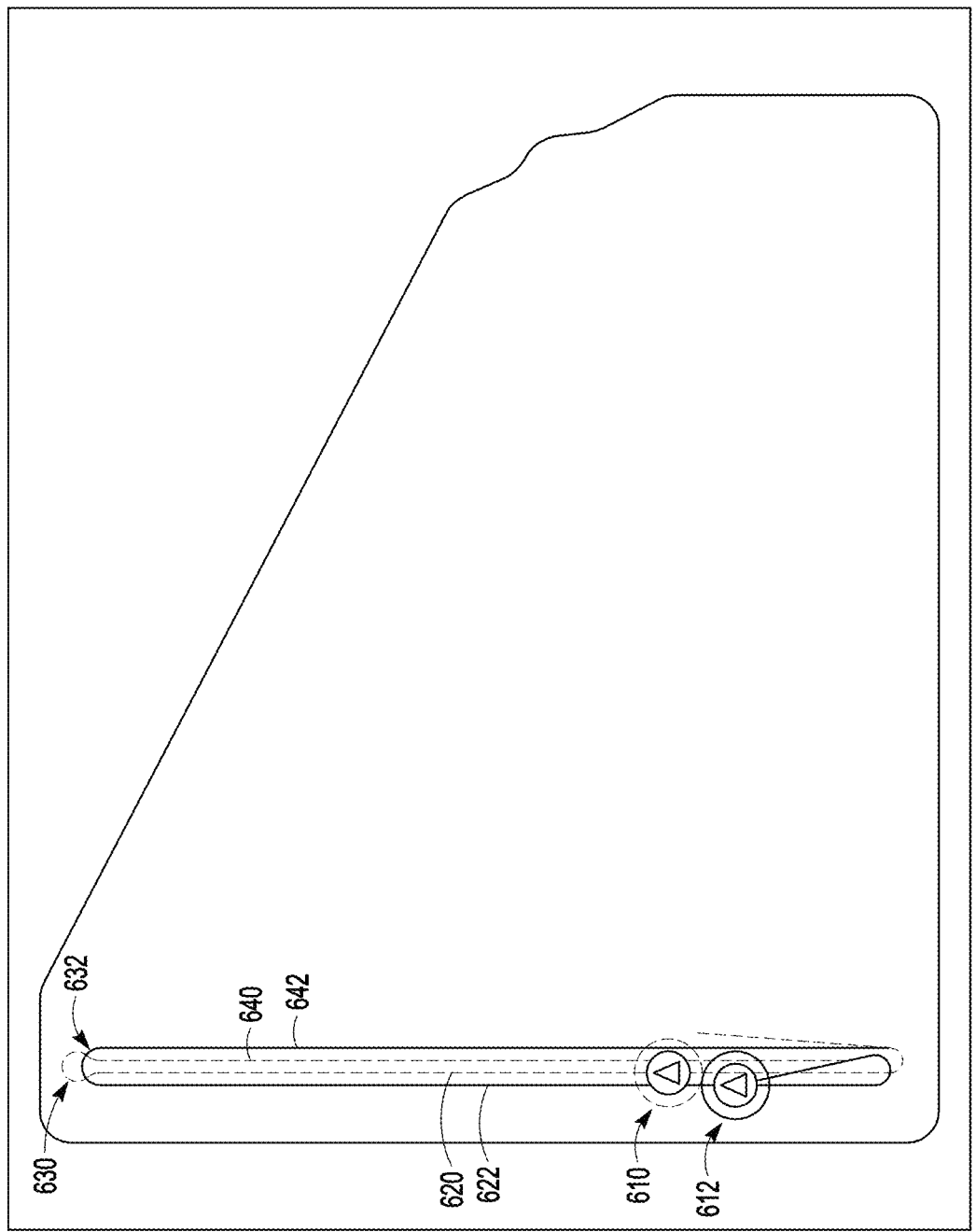
Figure 6B:
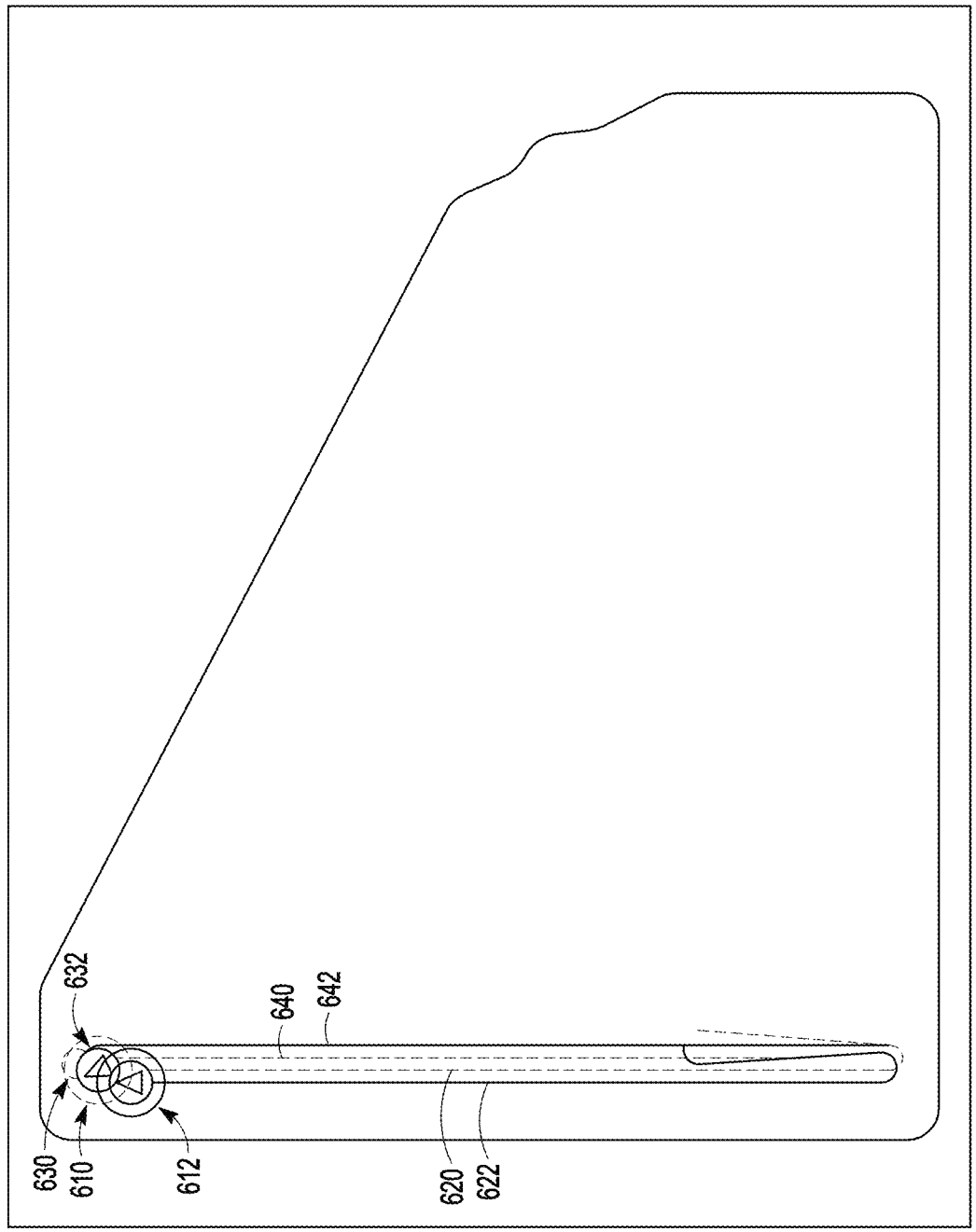
Figure 6C:
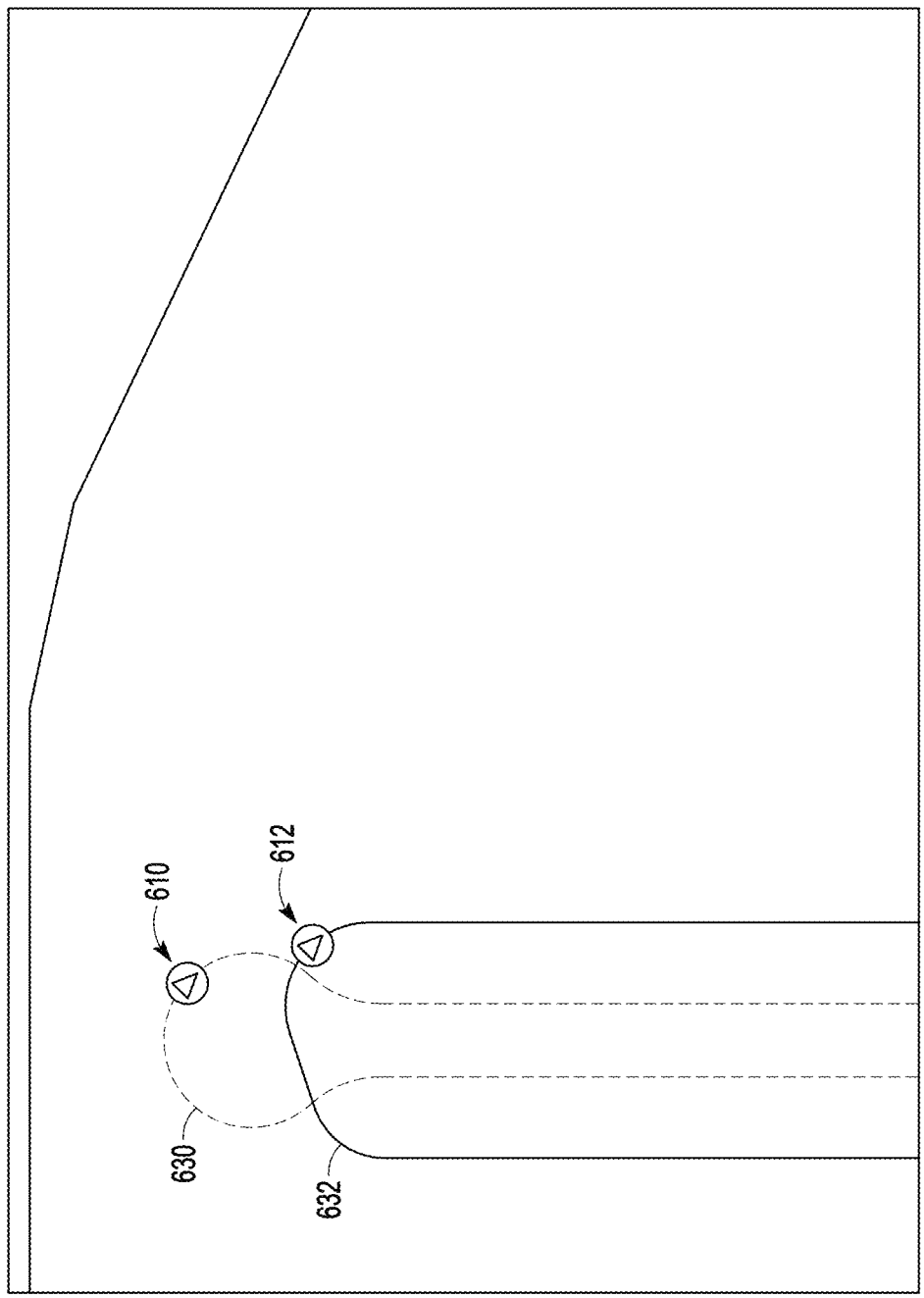

FIGS. 6A-6F illustrate an example of a coordinated task, according to some examples of the present disclosure. The illustrated task includes two agricultural machines (also referred to as vehicles) 610 and 612 performing a coordinated task. While not shown, other machines may be included in the task, operating in a coordinated or dispersed manner, and performing the same or different operations. For example, machines 610 and 612 may be spraying, and other machines (not shown) may be cultivating, for example. Each of the machines 610 and 612 may include a control system (e.g., operation controller, swath selector, guidance manager) that manages swaths and travel paths, avoids collisions, etc. as discussed above. In FIG. 6A, the machines are beginning a coordinated task. Each is operating on a current swath 620, 622 and has determined a next swath 640, 642. Machine 612 has a current swath 622 on the outside of the current swath 620 of machine 610. Each has also determined a travel path 630, 632 between their current swaths 620, 622 and their next swaths 640, 642. FIG. 6B illustrates the machines 610, 612 at the end of their current swaths 620, 622 and beginning their travel paths 630, 632. FIG. 6C is a close-up view of the machines 610, 612 on their travel paths 630, 632. The control system of machine 610, 612 may determine the travel paths 630, 632 and machine speeds to avoid collisions and to allow for turning. This may be done as discussed above, for example. In the illustrated example, the control system of machine 610 determines a mushroom (or lightbulb) turn for path 630 and a next swath 640 that lies to the inside of next swath 642. In FIG. 6D, the machines 610, 612 are shown at the beginning of swaths 640, 642 (now their current swaths) and each machine 610, 612 has determined another next swath 650, 652. FIGS. 6E and 6F illustrate further views of the machine 610, 612 as their control systems determine additional next swaths on their way to completing a coverage plan.

Figure 7A:
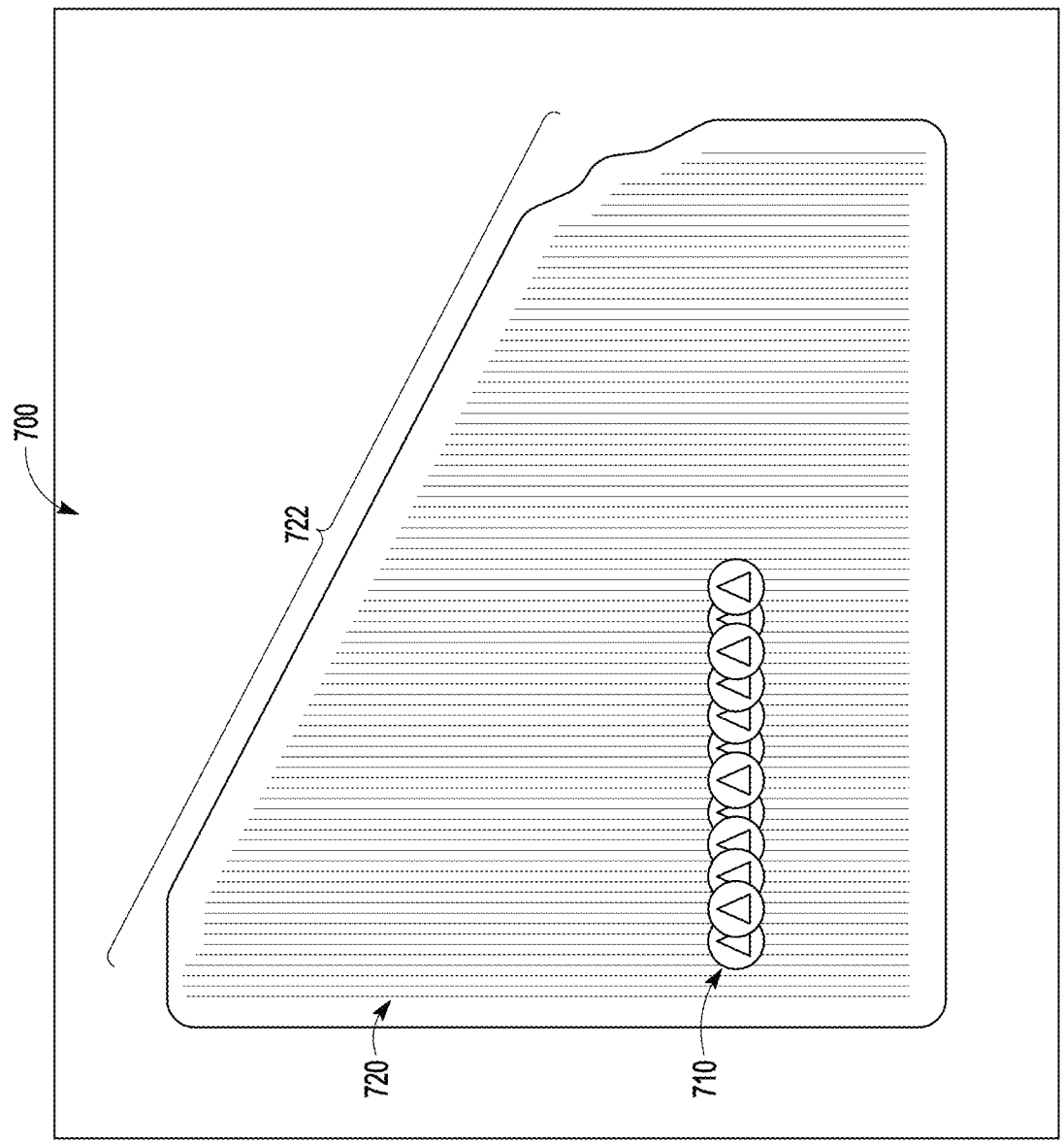
FIGS. 7A-7H illustrate one example of a dispersed ag vehicle task, according to some examples of the present disclosure.
Figure 7B:
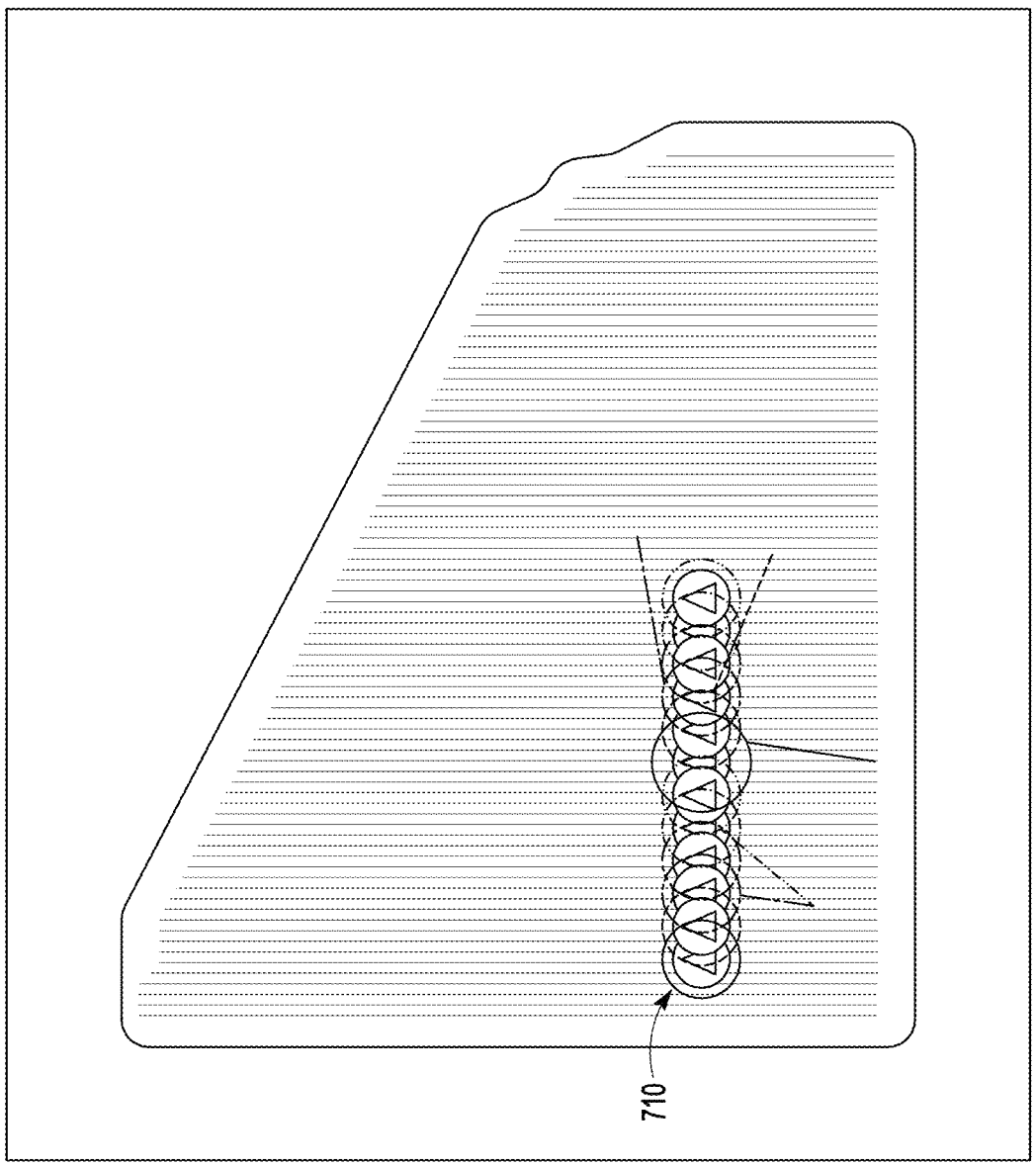
Figure 7C:
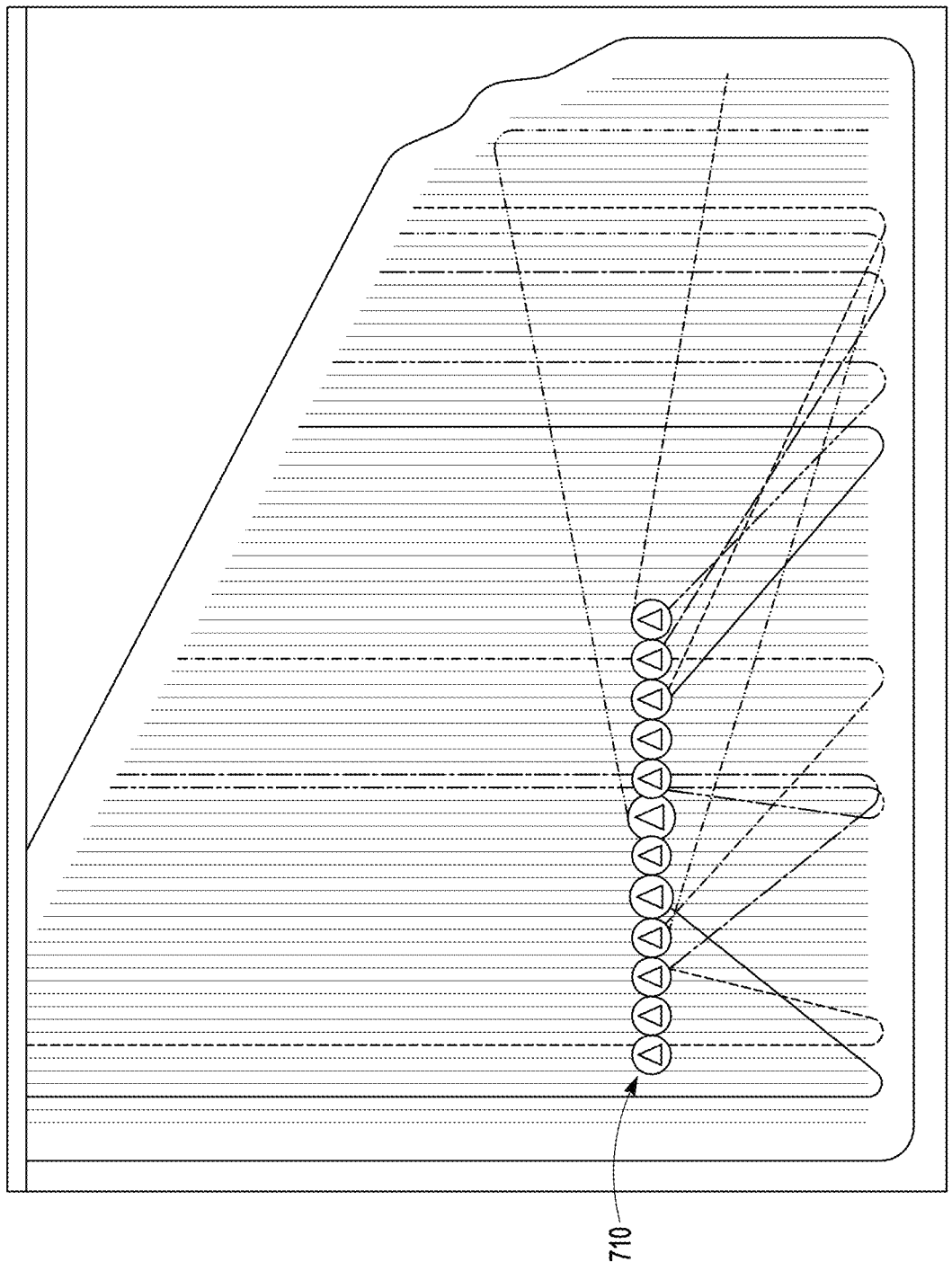
Figure 7D:
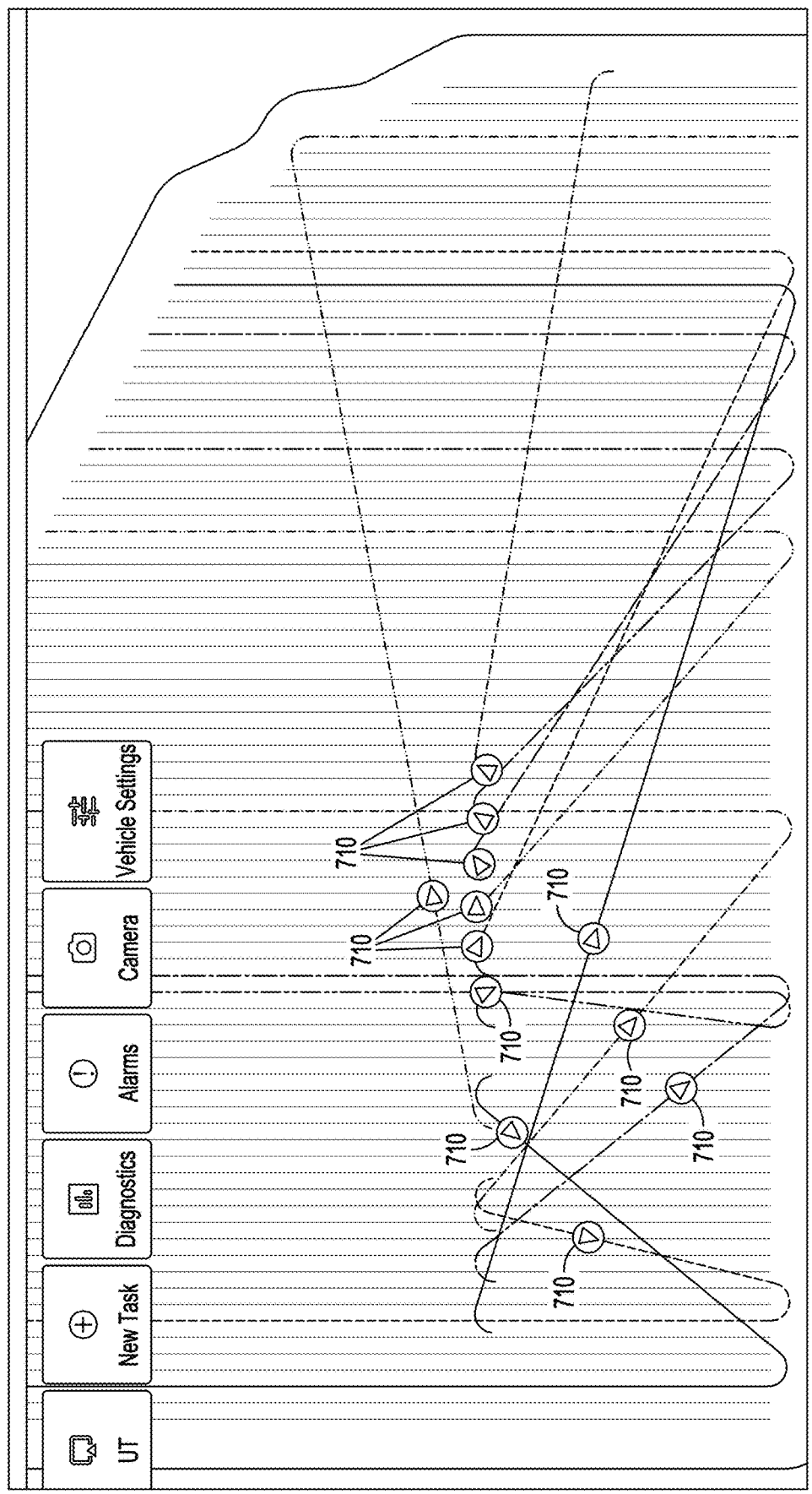
Figure 7E:
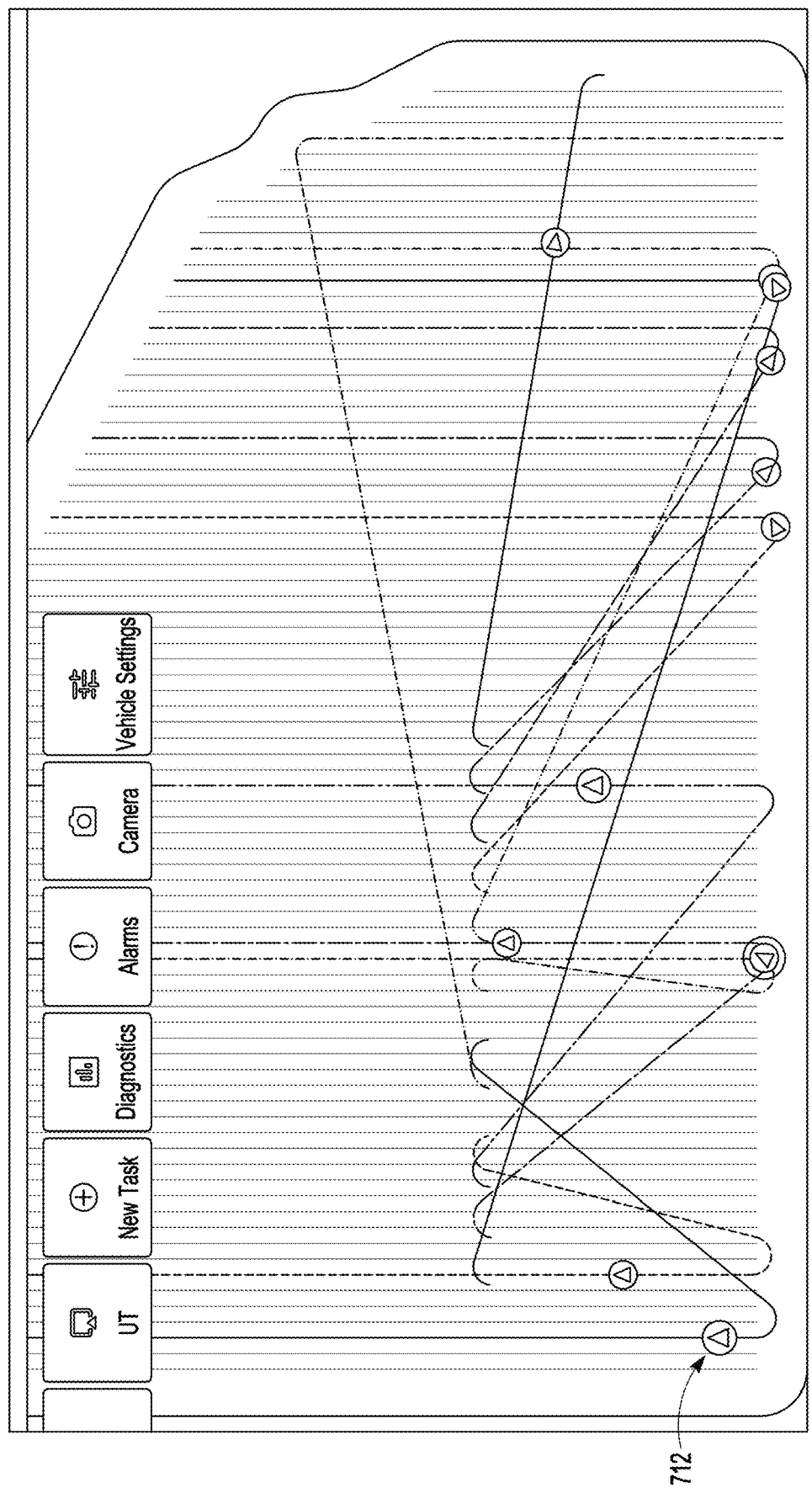
Figure 7F:
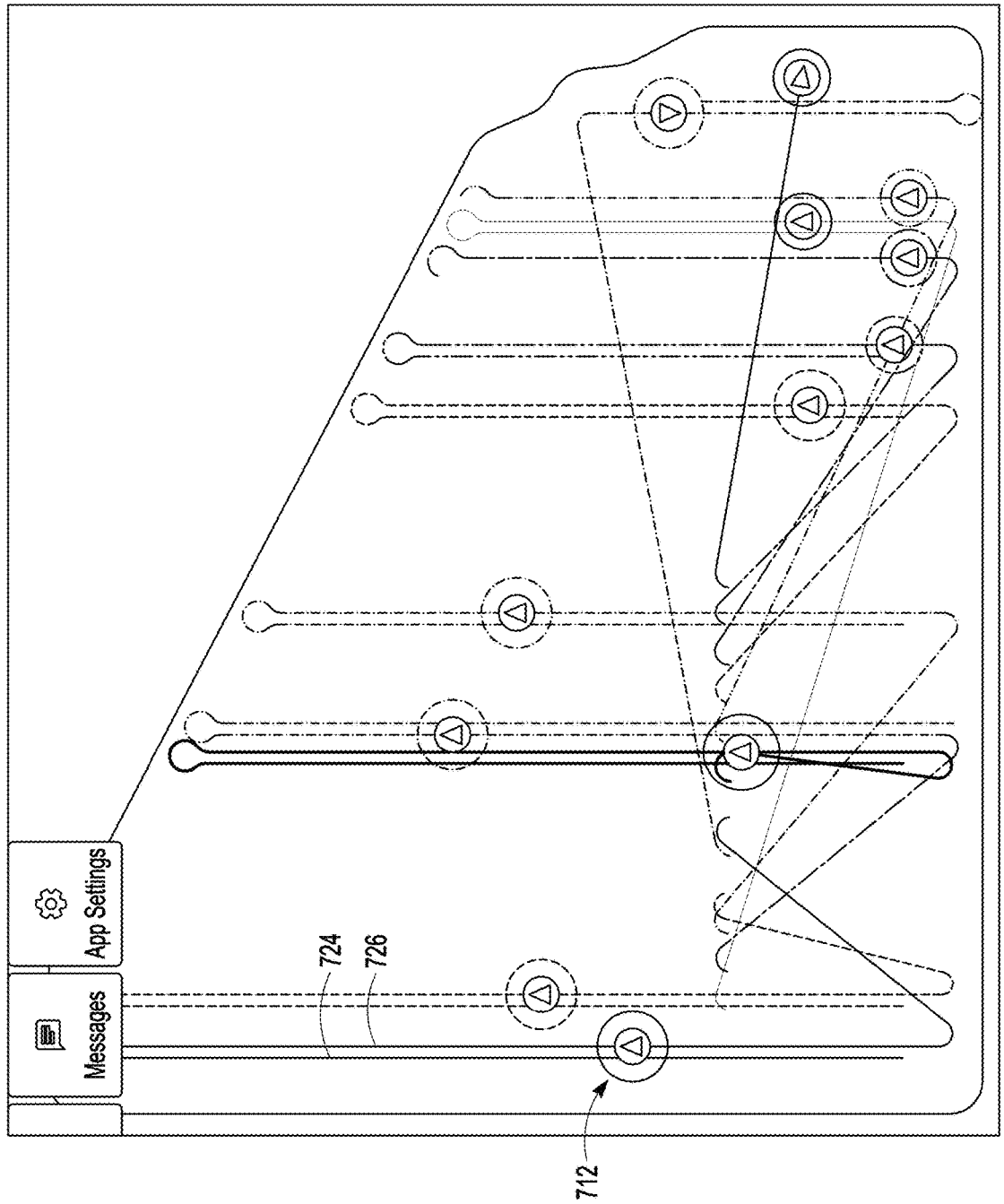
Figure 7G:
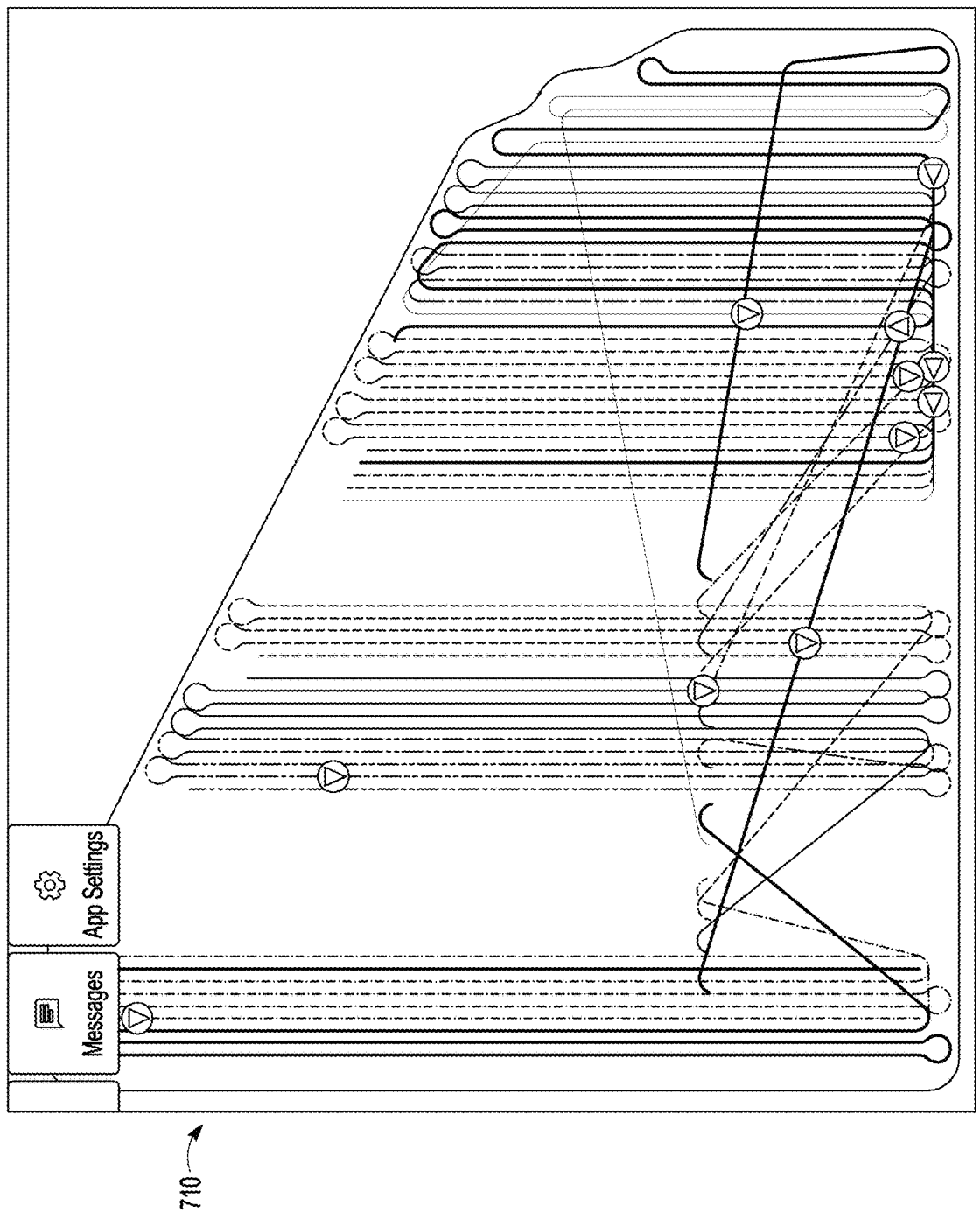
Figure 7H:
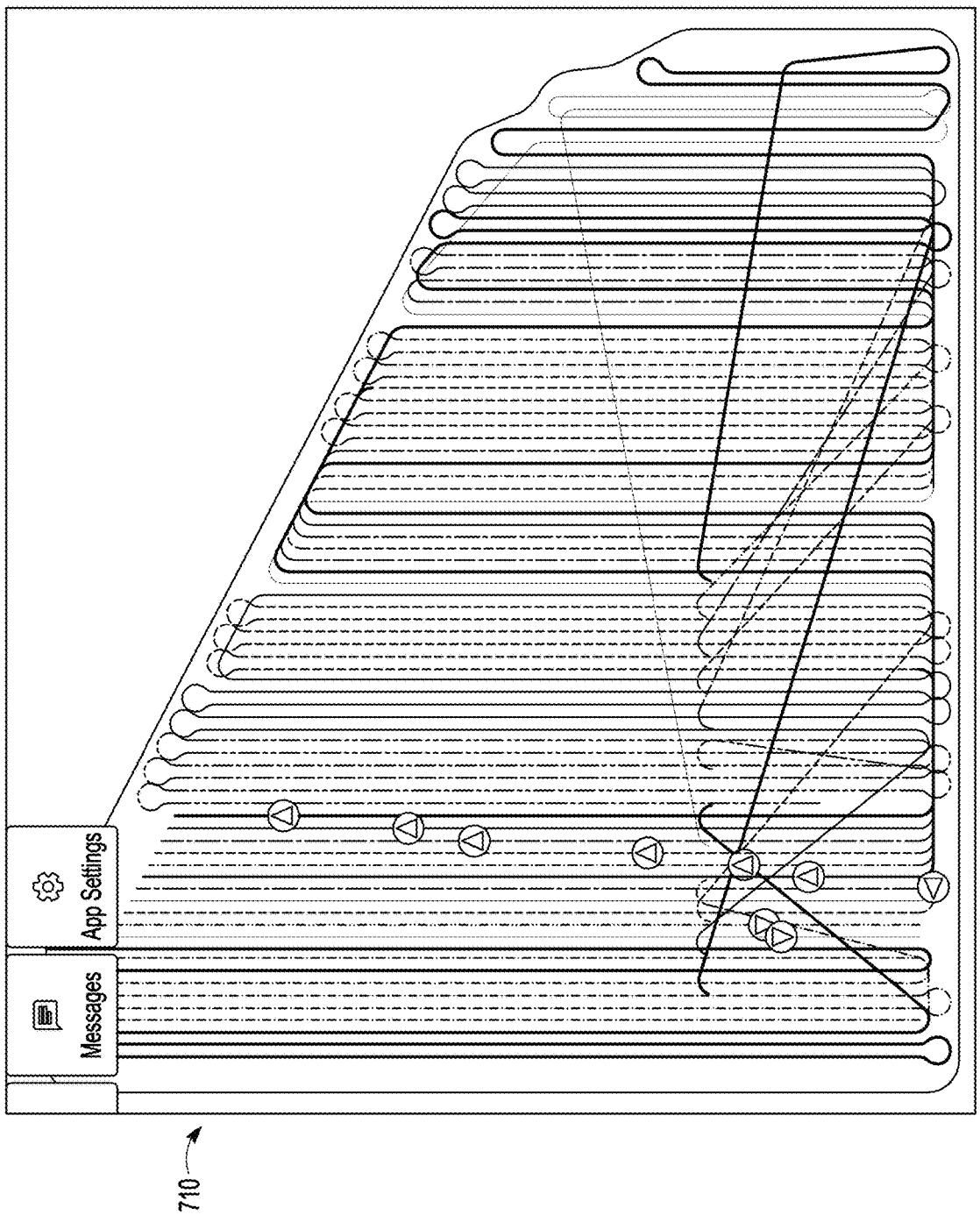

FIGS. 7A-7H illustrate an example of a dispersed task in a field 700, according to some examples of the present disclosure. The illustrated example shows several ag machines 710 working together to perform an operation in the field 700 according to a coverage plan 720 defining multiple swaths 722. FIG. 7A illustrates the vehicles 710 before beginning a dispersed task. FIGS. 7B and 7C illustrates the ag machines 710 determining next (e.g., first) swaths and travel paths to their next swaths. FIGS. 7D and 7E illustrates ag machines 710 as their control systems (e.g., operation controller, swath selector and guidance manager, etc.) control machine movement along travel paths to next (e.g., first) swaths. In FIG. 7E, ag machine 712 has just reached its first swath. In FIG. 7F, the ag machines move onto first swaths or continue on travel paths to first swaths. The control system of ag machine 712 has determined its next swath 724 while operating on its current (e.g., first) swath 726. FIGS. 7G and 7H illustrate further views of the machine 710 as their control systems determine additional swaths on their way to completing a coverage plan in a dispersed fashion.

Figure 8:
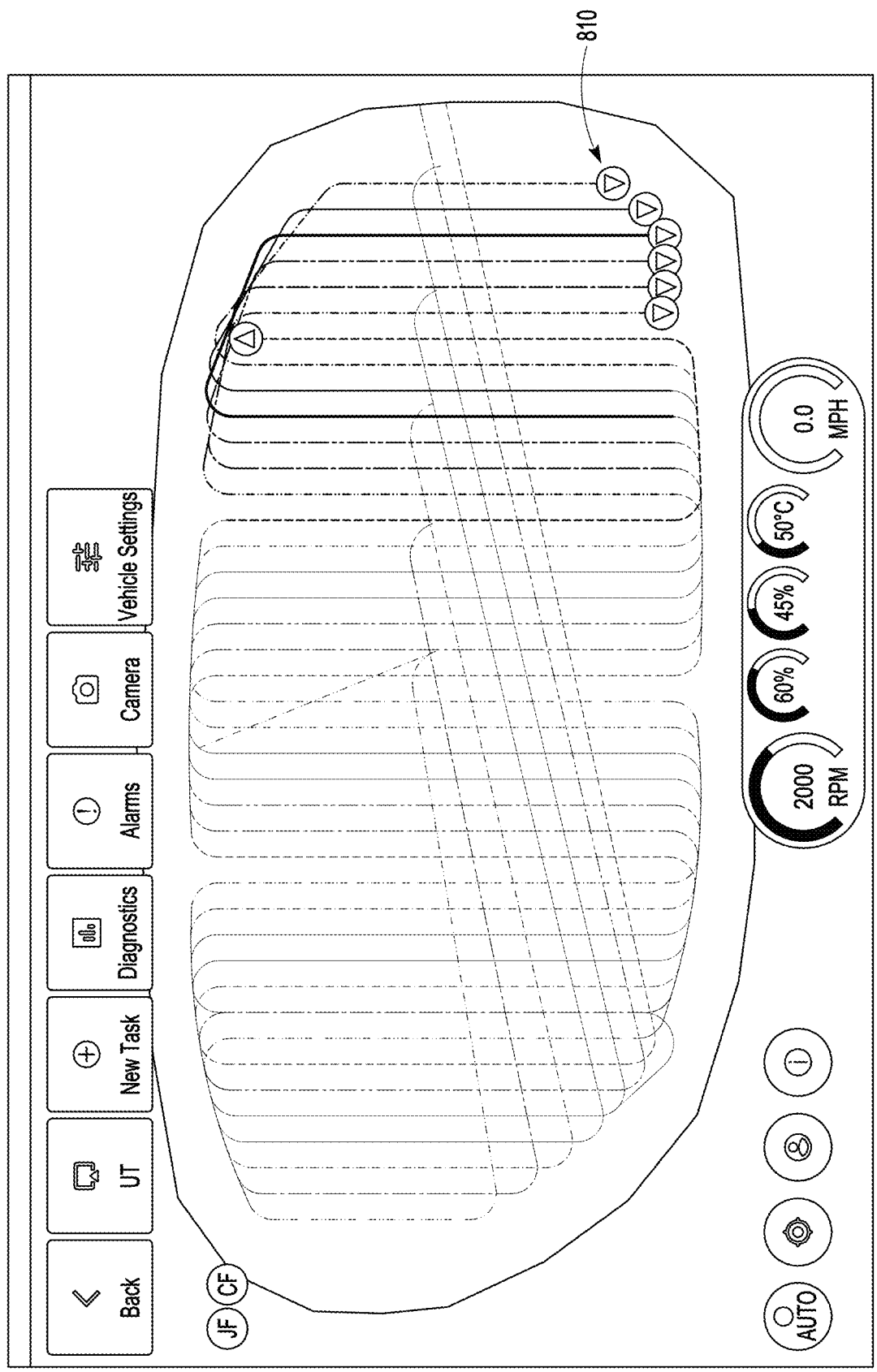
FIG. 8 illustrates another example of a coordinated ag vehicle task, according to some examples of the present disclosure.
Figure 9:
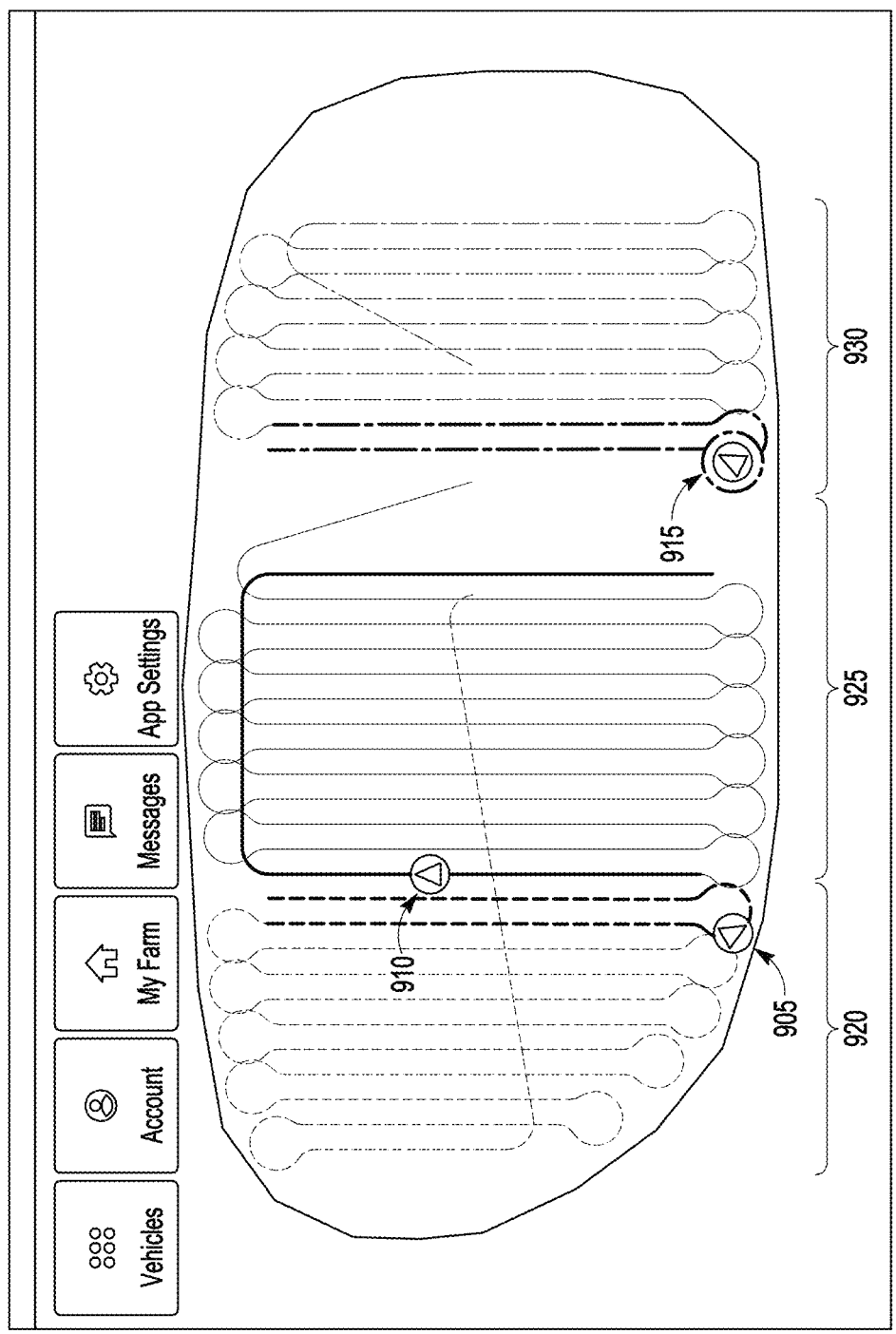
FIG. 9 illustrates another example of a dispersed ag vehicle task, according to some examples of the present disclosure.

FIG. 8 illustrates another example of a coordinated task, according to some examples of the present disclosure. The example illustrates six machines 810 working in 3 sets of pairs (e.g., each pair has a first machine and a wing man machine which operates in the same vicinity as the first machine). FIG. 9 illustrates another example of a dispersed task, according to some examples of the present disclosure. In this example, three ag machines 905, 910, 915 operate in a dispersed fashion at different locations and/or different directions. In the illustrated example, each of the machines 905, 910, 915 operates in its own region 920, 925, 930. Other machines (not shown) may be operating in the regions 920, 925, 930 as well.

Figure 10:
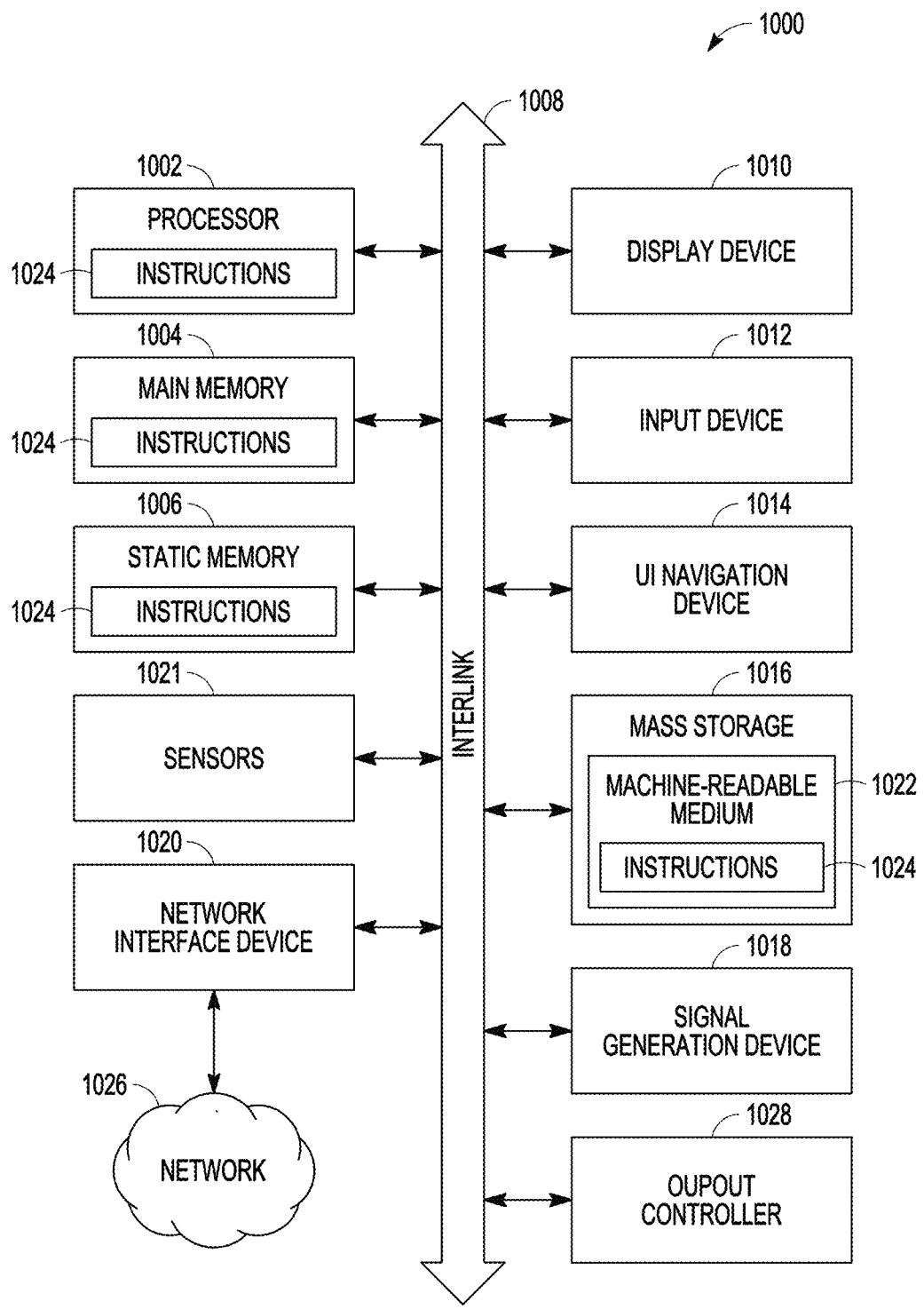
FIG. 10 is a block diagram illustrating an example of a computing system upon which one or more embodiments may be implemented.

FIG. 10 illustrates a block diagram of an example computing machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, a computing machine 1000 may be configured to implement the functionality of an operational manager, swath selector, guidance manager, and other computing systems of a vehicle (e.g., an agricultural machine). Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine-readable media. In some examples, machine-readable media may include machine-readable media that is not a transitory propagating signal.

The instructions 1024 may further be transmitted or received over a communications network 1026 using a transmission medium via the network interface device 1020. The Machine 1000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

ADDITIONAL NOTES & EXAMPLES

Example 1 is an agricultural vehicle coordination system for a first ag vehicle for coordinated work with one or more second ag vehicles, comprising: one or more vehicle sensors configured for coupling with the first agricultural vehicle, the one or more vehicle sensors configured to obtain vehicle kinematic data for the first ag vehicle; a network interface configured to communicate with the one or more second ag vehicles; a multi-vehicle coordination controller including: an operational manager configured to receive maintain first state data for the first ag vehicle, and receive second state data for the one or more second ag vehicles, the first state data includes vehicle kinematic data of the first ag vehicle and a current swath of the first ag vehicle, and the second state data includes a next swath and a current swath for each of the one or more second ag vehicles; a swath selector in communication with the operational manager, the swath selector capable of determining a next swath for the first ag vehicle and a travel path to the next swath for the first ag vehicle after an indication of a start of the current swath by the first ag vehicle, the determining of the next swath for the first ag vehicle and travel path for the first ag vehicle being based the first state data of the first ag vehicle and the second state data for each of the one or more second ag vehicles; and a guidance manager in communication with the swath selector, the guidance manager capable of determining guidance data based on the determined next swath and the determined travel path for the first ag vehicle, the guidance manager configured to provide the guidance data to one or more agricultural vehicle controllers for controlling the first ag vehicle in accordance with the guidance data.

In Example 2, the subject matter of Example 1 optionally includes wherein the swath selector is configured to determine the next swath for the first ag vehicle based on a type of task being performed, the type of task including one of a dispersed task or coordinated task.

In Example 3, the subject matter of Example 2 optionally includes wherein a coordinated task includes the first ag vehicle working in side-by-side coordination with at least one of the second ag vehicles.

In Example 4, the subject matter of Example 2 optionally includes wherein a dispersed task includes the first ag vehicle tasked in a different direction or to a different location than at least one of the second ag vehicles.

In Example 5, the subject matter of any one or more of Examples 1-4 optionally includes wherein the swath selector is configured to determine a conflict between the next swath of the first ag vehicle and a next swath determined by one or more of the second ag vehicles.

In Example 6, the subject matter of Example 5 optionally includes wherein the swath selector is configured to resolve the conflict based on a pre-determined priority between the first ag vehicle and the one or more of the second ag vehicles.

In Example 7, the subject matter of any one or more of Examples 1-6 optionally includes wherein the swath selector is configured to: determine an initial next swath of the first ag vehicle is the same as the next swath of a second ag vehicle; determine the second ag vehicle has swath priority; and determine an updated next swath for the first ag vehicle after determining the second ag vehicle has swath priority.

In Example 8, the subject matter of any one or more of Examples 1-7 optionally-includes wherein the swath selector is configured to determine the next swath based on a distance to the next swath.

In Example 9, the subject matter of any one or more of Examples 1-8 optionally includes wherein the swath selector is configured to determine the next swath based on a path to the next swath.

In Example 10, the subject matter of any one or more of Examples 1-9 optionally includes wherein the swath selector is configured to determine the next swath based on a dimension profile of the first ag vehicle.

In Example 11, the subject matter of any one or more of Examples 1-10 optionally includes wherein the swath selector is configured to determine the next swath based on a heading of the first ag vehicle and a heading of one or more of the second ag vehicles.

In Example 12, the subject matter of any one or more of Examples 1-11 optionally includes wherein the swath selector is configured to dynamically determine a path between the current swath of the first ag vehicle and the next swath of the first ag vehicle while the first ag vehicle is operating on the current swath of the first ag vehicle.

In Example 13, the subject matter of Example 12 optionally includes wherein the guidance manager is configured to send the guidance data based on the determined swath and the determined path to a steering controller for the first ag vehicle.

In Example 14, the subject matter of any one or more of Examples 1-13 optionally includes wherein the swath selector is configured to determine a potential collision between first ag vehicle and one of the one or more second ag vehicles based on i) a speed and a future path of the first ag vehicle and ii) a speed and a future path of the one second ag vehicle; and the multi-vehicle coordination controller is configured to adjust the speed or the travel path of the first ag vehicle to avoid the potential collision.

In Example 15, the subject matter of Example 14 optionally includes wherein the swath selector is configured to determine the potential collision based on a dimension profile of the first ag vehicle and a dimension profile of the one second ag vehicle.

In Example 16, the subject matter of any one or more of Examples 1-15 optionally includes wherein the swath selector is configured to determine the next swath based on the current swath and heading of the first ag vehicle, the heading for each of the one or more second ag vehicles, the current swath of each of the one or more second ag vehicles, and the next swath for each of the one or more second ag vehicles.

In Example 17, the subject matter of any one or more of Examples 1-16 optionally includes wherein the operational manager is configured to receive a coverage plan with a plurality pre-defined swaths from a remote user controller, the swath selector being configured to determine the next swath for the first ag vehicle by selecting an open one of the pre-defined swaths.

In Example 18, the subject matter of any one or more of Examples 1-17 optionally includes wherein the operational manager is configured to receive the state data using a network.

In Example 19, the subject matter of any one or more of Examples 1-18 optionally includes wherein the swath selector is configured to determine the next swath based on a dimension profile of the first ag vehicle.

In Example 20, the subject matter of any one or more of Examples 1-19 optionally includes wherein the operational manager is configured to send state data for the first ag vehicle to an operational manager associated with each of the one or more second ag vehicles.

Example 21 is a method of coordinating multiple agricultural machines for operation on an agricultural field, comprising: maintaining, by a controller of a respective machine of the multiple machines, state data for the respective machine; and receiving, by the controller of the respective machine, state data from one or more other machines of the multiple machines, the state data for each of the one or more other machines including a next swath and a current swath; and after an indication of a start of a current swath by the respective machine, determining, by the controller of the respective machine, a next swath for the respective machine, based on state data for the respective machine and the state data for each of the one or more other machines.

In Example 22, the subject matter of Example 21 optionally includes wherein determining the next swath for the respective machine includes determining the next swath for the respective machine based on a type of task being performed, the type of task including one of a dispersed task or coordinated task.

In Example 23, the subject matter of Example 22 optionally includes wherein a coordinated task includes the respective machine working in side-by-side coordination with at least a second machine of the multiple machines.

In Example 24, the subject matter of Example 22 optionally includes wherein a dispersed task includes the respective machine tasked in a different direction or to a different location than at least a second machine of the multiple machines.

In Example 25, the subject matter of any one or more of Examples 21-24 optionally includes wherein determining the next swath for the respective machine includes resolving a conflict between the next swath of the respective machine and a next swath of at least a second machine of the multiple machines, In Example 26, the subject matter of Example 25 optionally includes wherein resolving the conflict includes resolving the conflict based on a pre-determined priority between the respective machine and the second machine.

In Example 27, the subject matter of any one or more of Examples 21-26 optionally includes wherein determining the next swath for the respective machine includes: determining an initial next swath of the respective machine is the same as the next swath of a second machine; determining the second machine has swath priority; and determining an updated next swath for the respective machine after determining the second machine has swath priority.

In Example 28, the subject matter of any one or more of Examples 21-27 optionally includes wherein determining the next swath for the respective machine includes determining the next swath based on a distance to the next swath.

In Example 29, the subject matter of any one or more of Examples 21-28 optionally includes wherein determining the next swath for the respective machine includes determining the next swath based on a path to the next swath.

In Example 30, the subject matter of any one or more of Examples 21-29 optionally includes wherein determining the next swath for the respective machine includes determining the next swath based on a dimension profile of the respective machine.

In Example 31, the subject matter of any one or more of Examples 21-30 optionally includes wherein determining the next swath for the respective machine includes determining the next swath based on a heading of the respective machine and a heading of a second machine.

In Example 32, the subject matter of any one or more of Examples 21-31 optionally further includes dynamically determining, by the respective machine, a path between the current swath of the respective machine and the next swath of the respective machine while the respective machine is operating on the current swath of the respective machine.

In Example 33, the subject matter of Example 32 optionally further includes sending the determined swath and the determined path for the respective machine to a steering controller for the respective machine.

In Example 34, the subject matter of any one or more of Examples 21-33 optionally further includes determining, by the controller of the respective machine, a potential collision between the respective machine and a second machine based on i) a speed and a future path of the respective machine and ii) a speed and a future path of a second machine; and adjusting, by the controller of the respective machine, the speed or the future path of the respective machine to avoid the potential collision.

In Example 35, the subject matter of Example 34 optionally includes wherein determining, by the controller of the respective machine, the potential collision is further based on a dimension profile of the respective machine and a dimension profile of the second machine.

In Example 36, the subject matter of any one or more of Examples 21-35 optionally includes wherein determining the next swath for the respective machine includes determining the next swath based on the current swath and heading of the respective machine, the heading for each of the one or more other machines, the current swath of each of the one or more other machines, and the next swath for each of the one or more other machines.

In Example 37, the subject matter of any one or more of Examples 21-36 optionally further includes receiving a coverage plan from a remote user controller, the coverage plan including a plurality of pre-defined swaths.

In Example 38, the subject matter of any one or more of Examples 21-37 optionally further includes receiving the state data using a network.

In Example 39, the subject matter of any one or more of Examples 21-38 optionally includes wherein determining the next swath for the respective machine includes determining the next swath based on a dimension profile of the respective machine.

In Example 40, the subject matter of any one or more of Examples 21-39 optionally further includes sending state data for the respective machine to a controller associated with each of one or more other machines of the multiple machines.

In Example 41, the subject matter of any one or more of Examples 21-40 optionally further includes receiving, by the controller of the respective machine, prior field operations data and dynamically determining swaths using the prior field operations data.

In Example 42, the subject matter of any one or more of Examples 1-20 optionally includes wherein the operational manager is configured to receive a prior field operations data and the swath selector is configured to dynamically determine swaths using the prior field operations data.

Example 43 is at least one machine-readable medium including instructions that, when executed by processing circuitry, cause the processing circuitry to perform operations to implement of any of Examples 1-42.

Example 44 is an apparatus comprising means to implement of any of Examples 1-42.

Example 45 is a system to implement of any of Examples 1-42.

Example 46 is a method to implement of any of Examples 1-42.

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An agricultural (ag) vehicle coordination system for a first ag vehicle for coordinated work with one or more second ag vehicles, comprising:
   one or more vehicle sensors configured for coupling with the first agricultural vehicle, the one or more vehicle sensors configured to obtain vehicle kinematic data for the first ag vehicle;
   a network interface configured to communicate with the one or more second ag vehicles;
   a multi-vehicle coordination controller including:
   an operational manager configured to receive maintain first state data for the first ag vehicle, and receive second state data for the one or more second ag vehicles using the network interface, the first state data includes the vehicle kinematic data of the first ag vehicle and a current swath of the first ag vehicle, and the second state data includes a next swath and a current swath for each of the one or more second ag vehicles;
   a swath selector in communication with the operational manager, the swath selector capable of dynamically determining a next swath in real time for the first ag vehicle and a travel path to the next swath for the first ag vehicle after an indication of a start of the current swath by the first ag vehicle, the determining of the next swath for the first ag vehicle and travel path for the first ag vehicle being based on the first state data of the first ag vehicle and the second state data for each of the one or more second ag vehicles, wherein the swath selector is configured to determine the next swath for the first ag vehicle based on a type of task being performed, the type of task including one of a dispersed task or coordinated task; and
   a guidance manager in communication with the swath selector, the guidance manager capable of determining guidance data based on the dynamically determined next swath and the determined travel path for the first ag vehicle, the guidance manager configured to provide the guidance data to one or more agricultural vehicle controllers, the one or more agricultural vehicle controllers configured to control the first ag vehicle in accordance with the guidance data.

2. The system of claim 1, wherein a coordinated task includes the first ag vehicle working in side-by-side coordination with at least one of the second ag vehicles.

3. The system of claim 1, wherein a dispersed task includes the first ag vehicle tasked in a different direction or to a different location than at least one of the second ag vehicles.

4. The system of claim 1, wherein the swath selector is configured to determine a conflict between the next swath of the first ag vehicle and a next swath received from one or more of the second ag vehicles.

5. The system of claim 4, wherein the swath selector is configured to resolve the conflict based on a pre-determined priority between the first ag vehicle and the one or more of the second ag vehicles.

6. The system of claim 1, wherein the swath selector is configured to:
   determine an initial next swath of the first ag vehicle is the same as the next swath of a second ag vehicle;
   determine the second ag vehicle has swath priority; and
   determine an updated next swath for the first ag vehicle after determining the second ag vehicle has swath priority.

7. The system of claim 1, wherein the swath selector is configured to determine the next swath based on a distance to the next swath.

8. The system of claim 1, wherein the swath selector is configured to determine the next swath based on a path to the next swath.

9. The system of claim 1, wherein the swath selector is configured to determine the next swath based on a dimension profile of the first ag vehicle.

10. The system of claim 1, wherein the swath selector is configured to determine the next swath based on a heading of the first ag vehicle and a heading of one or more of the second ag vehicles.

11. The system of claim 1, wherein the swath selector is configured to dynamically determine a path between the current swath of the first ag vehicle and the next swath of the first ag vehicle while the first ag vehicle is operating on the current swath of the first ag vehicle.

12. The system of claim 11, wherein the guidance manager is configured to send the guidance data based on the determined swath and the determined path to a steering controller for the first ag vehicle.

13. The system of claim 1, wherein the swath selector is configured to determine a potential collision between the first ag vehicle and one of the one or more second ag vehicles based on i) a speed and a future path of the first ag vehicle and ii) a speed and a future path of the one second ag vehicle; and
   the multi-vehicle coordination controller is configured to adjust the speed or the travel path of the first ag vehicle to avoid the potential collision.

14. The system of claim 13, wherein the swath selector is configured to determine the potential collision based on a dimension profile of the first ag vehicle and a dimension profile of the one second ag vehicle.

15. The system of claim 1, wherein the swath selector is configured to determine the next swath based on the current swath and heading of the first ag vehicle, the heading for each of the one or more second ag vehicles, the current swath of each of the one or more second ag vehicles, and the next swath for each of the one or more second ag vehicles.

16. The system of claim 1, wherein the operational manager is configured to receive a coverage plan with a plurality of pre-defined swaths from a remote user controller, the swath selector being configured to determine the next swath for the first ag vehicle by selecting an open one of the pre-defined swaths.

17. The system of claim 1, wherein the operational manager is configured to receive the state data using a network.

18. The system of claim 1, wherein the operational manager is configured to send the first state data for the first ag vehicle to an operational manager associated with each of the one or more second ag vehicles.

19. A method of coordinating multiple agricultural machines for operation on an agricultural field, comprising:
   maintaining, by a controller of a respective machine of the multiple machines, state data for the respective machine; and
   receiving, by the controller of the respective machine, state data from one or more other machines of the multiple machines, the state data for each of the one or more other machines including a next swath and a current swath;
   after an indication of a start of a current swath by the respective machine, dynamically determining, by the controller of the respective machine, a next swath for the respective machine in real time, based on state data for the respective machine and the state data for each of the one or more other machines, wherein determining the next swath for the respective machine includes determining the next swath for the respective machine based on a type of task being performed, the type of task including one of a dispersed task or coordinated task;
   determining, by the controller of the respective machine, guidance data based on the dynamically determined next swath; and
   controlling, by the controller of the respective machine, the respective machine in accordance with the guidance data.

20. The method of claim 1, wherein a coordinated task includes the respective machine working in side-by-side coordination with at least a second machine of the multiple machines.

21. The method of claim 1, wherein a dispersed task includes the respective machine tasked in a different direction or to a different location than at least a second machine of the multiple machines.

22. The method of claim 19, wherein determining the next swath for the respective machine includes resolving a conflict between the next swath of the respective machine and a next swath of at least a second machine of the multiple machines.

23. The method of claim 22, wherein resolving the conflict includes resolving the conflict based on a predetermined priority between the respective machine and the second machine.

24. The method of claim 19, wherein determining the next swath for the respective machine includes:
   determining an initial next swath of the respective machine is the same as the next swath of a second machine;
   determining the second machine has swath priority; and
   determining an updated next swath for the respective machine after determining the second machine has swath priority.

25. The method of claim 19, wherein determining the next swath for the respective machine includes determining the next swath based on a distance to the next swath.

26. The method of claim 19, wherein determining the next swath for the respective machine includes determining the next swath based on a path to the next swath.

27. The method of claim 19, wherein determining the next swath for the respective machine includes determining the next swath based on a dimension profile of the respective machine.

28. The method of claim 19, wherein determining the next swath for the respective machine includes determining the next swath based on a heading of the respective machine and a heading of a second machine.

29. The method of claim 19, further including dynamically determining, by the respective machine, a path between the current swath of the respective machine and the next swath of the respective machine while the respective machine is operating on the current swath of the respective machine.

30. The method of claim 29, further including sending the determined swath and the determined path for the respective machine to a steering controller for the respective machine.

31. The method of claim 19, further including:
   determining, by the controller of the respective machine, a potential collision between the respective machine and a second machine based on i) a speed and a future path of the respective machine and ii) a speed and a future path of a second machine; and
   adjusting, by the controller of the respective machine, the speed or the future path of the respective machine to avoid the potential collision.

32. The method of claim 31, wherein determining, by the controller of the respective machine, the potential collision is further based on a dimension profile of the respective machine and a dimension profile of the second machine.

33. The method of claim 19, wherein determining the next swath for the respective machine includes determining the next swath based on the current swath and heading of the respective machine, the heading for each of the one or more other machines, the current swath of each of the one or more other machines, and the next swath for each of the one or more other machines.

34. The method of claim 19, further including receiving a coverage plan from a remote user controller, the coverage plan including a plurality of pre-defined swaths.

35. The method of claim 19, further including receiving the state data using a network.

36. The method of claim 19, further including sending state data for the respective machine to a controller associated with each of one or more other machines of the multiple machines.

37. The method of claim 19, further including receiving, by the controller of the respective machine, prior field operations data and dynamically determining swaths using the prior field operations data.

38. The system of claim 1, wherein the operational manager is configured to receive a prior field operations data and the swath selector is configured to dynamically determine swaths using the prior field operations data.

* * * * *